US012659913B2

(12) United States Patent
Hao et al.

(10) Patent No.: US 12,659,913 B2
(45) Date of Patent: Jun. 16, 2026

(54) COMMUNICATION METHOD AND COMMUNICATION APPARATUS THAT ARE USED FOR POSITIONING

(71) Applicant: HUAWEI TECHNOLOGIES CO., LTD., Shenzhen (CN)

(72) Inventors: Jinping Hao, Shanghai (CN); Yinghao Jin, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 18/513,828

(22) Filed: Nov. 20, 2023

(65) Prior Publication Data

US 2024/0089900 A1 Mar. 14, 2024

Related U.S. Application Data

(63) Continuation of application No. PCT/CN2022/092588, filed on May 13, 2022.

(30) Foreign Application Priority Data

May 21, 2021 (CN) .......................... 202110559090.8

(51) Int. Cl.
| | |
|---|---|
| *H04W 64/00* | (2009.01) |
| *H04W 8/08* | (2009.01) |
| *H04W 84/12* | (2009.01) |

(52) U.S. Cl.
CPC ............. *H04W 64/00* (2013.01); *H04W 8/08* (2013.01); *H04W 84/12* (2013.01)

(58) Field of Classification Search
CPC ....... H04W 64/00; H04W 8/08; H04W 84/12; H04W 4/02; H04W 64/003; G01S 19/42
See application file for complete search history.

(56) References Cited

U.S. PATENT DOCUMENTS

| | | | |
|---|---|---|---|
| 6,397,065 B1 | 5/2002 | Huusko et al. | |
| 8,768,297 B2 * | 7/2014 | Vikberg | .............. H04M 15/851 |
| | | | 455/406 |

(Continued)

FOREIGN PATENT DOCUMENTS

| | | |
|---|---|---|
| CN | 1984476 A | 6/2007 |
| CN | 102111709 A | 6/2011 |
| WO | 2022028960 A1 | 2/2022 |

OTHER PUBLICATIONS

3GPP TSG-RAN WG3 Meeting #108-e R3-203084, "Introduction of Positioning Support over F1 AP", Qualcomm Incorporated, May 21, 2020, XP51887622A, total 144 pages.

(Continued)

*Primary Examiner* — Kenneth T Lam

(57) ABSTRACT

The technology of this application relates to a communication method and a communication apparatus used for positioning. The method includes a positioning device sending a request to an access network device, where the request is used to request information about a cell type of the access network device, and the cell type includes an indoor cell or an outdoor cell, or the cell type includes any one of: a macro cell, a micro cell, or a lampsite cell. The positioning device receives the information about the cell type from the access network device. The request may be sent to the access network device by using a transmission reception point (TRP) information request message, and the information about the cell type may be received by using a TRP information response message.

18 Claims, 7 Drawing Sheets

Positioning device

Access network device

401: TRP information request message

402: TRP information response message

(56) References Cited

U.S. PATENT DOCUMENTS

| | | | | |
|---|---|---|---|---|
| 12,096,284 | B2* | 9/2024 | Gao | H04W 8/08 |
| 2012/0015660 | A1* | 1/2012 | Kawaguchi | H04W 36/0061 |
| | | | | 455/438 |
| 2015/0264632 | A1* | 9/2015 | Zhi | H04W 48/16 |
| | | | | 455/418 |
| 2016/0100358 | A1* | 4/2016 | Hayashi | H04W 48/20 |
| | | | | 370/329 |
| 2020/0029253 | A1* | 1/2020 | Yan | H04W 64/00 |
| 2022/0322273 | A1* | 10/2022 | Agnihotri | G01S 5/0205 |
| 2023/0309042 | A1* | 9/2023 | Da | H04W 56/005 |
| 2024/0163830 | A1* | 5/2024 | Li | H04W 64/00 |

OTHER PUBLICATIONS

European Search Report for EP Application No. 22803870.9 dated Oct. 15, 2024, 7 pages.
3GPP TSG RAN WG1 Meeting #100-e, R1-2000194, RAN procedures for NR positioning, Huawei, HiSilicon, Feb. 24-Mar. 6, 2020, total 7 pages.
Office Action for Chinese Application No. 202110559090.8 dated Nov. 28, 2024, 15 pages.

* cited by examiner

COMMUNICATION METHOD AND COMMUNICATION APPARATUS THAT ARE USED FOR POSITIONING

CROSS-REFERENCE TO RELATED APPLICATIONS

This application is a continuation of International Application No. PCT/CN2022/092588, filed on May 13, 2022, which claims priority to Chinese Patent Application No. 202110559090.8, filed on May 21, 2021. The disclosures of the aforementioned applications are hereby incorporated by reference in their entireties.

TECHNICAL FIELD

This application relates to communication technologies, and in particular, to a communication method and a communication apparatus.

BACKGROUND

A positioning function is an important function of 5G new radio (NR). Currently, a location management function (LMF) device obtains, for positioning, location information of a cell in which a terminal device is located. How to improve positioning performance is a problem that needs to be considered.

SUMMARY

Embodiments of this application provide a communication method and a communication apparatus, to improve positioning performance.

A first aspect of embodiments of this application provides a communication method. The method includes:

A positioning device sends a request to an access network device. The request is used to request information about a cell type of the access network device. Then, the positioning device receives the information about the cell type from the access network device. The cell type includes an indoor cell or an outdoor cell; or the cell type includes any one of the following: a macro cell, a micro cell, or a lampsite cell.

It can be learned from the foregoing solution that the positioning device obtains the information about the cell type from the access network device. In this way, the positioning device may select a more applicable positioning method for a terminal device based on the information about the cell type, to improve positioning precision, and improve positioning performance. For example, the positioning method includes a positioning method based on a radio access technology, and a global navigation satellite system (GNSS) positioning method. A cell of the access network device is located indoors, or may be located outdoors. The access network device notifies the positioning device of a type of each cell of the access network device by using the indoor cell or the outdoor cell. A macro site is usually deployed outdoors, and a small cell, a micro site, and a lamp site are usually deployed indoors. Therefore, the access network device indirectly notifies, by using the macro cell, the micro cell, or the lampsite cell, the positioning device of whether the cell is an outdoor cell or an outdoor cell.

For example, because an indoor GNSS signal is very weak, the GNSS positioning method is not applicable to a terminal device located indoors. If the positioning device determines that the terminal device is located indoors, the positioning device may select the positioning method based on the radio access technology for the terminal device. For example, the GNSS positioning method is more applicable to an outdoor scenario. The terminal device is located outdoors, a distance between base stations is large, and a GNSS signal is strong. In this case, the positioning device may select the GNSS positioning method for the terminal device.

In a possible implementation, that a positioning device sends a request to an access network device includes: The positioning device sends the request to the access network device by using a transmission reception point (TRP) information request message. That the positioning device receives the information about the cell type from the access network device includes: The positioning device receives the information about the cell type from the access network device by using a TRP information response message.

In this possible implementation, the positioning device requests and obtains the information about the cell type of the access network device by using a TRP information request. In this way, there is no need to define a new message, message resources are saved, and practicability of this solution is improved. In addition, TRP information may include information about the cell, to help the access network device parse the request of the positioning device. In addition, the positioning device may determine, based on the TRP information, a specific cell whose information about a type is the information about the cell type. The positioning device does not need to indicate, by using other indication signaling or another indication field, a specific cell or specific cells whose information about a type is specifically requested. The access network device does not need to indicate, by using another indication instruction or indication field, a specific cell or specific cells whose information about a type is specifically provided, either. Therefore, signaling overheads or bit overheads are reduced.

In another possible implementation, the TRP information request message includes a TRP information type item. That the request is used to request the information about the cell type includes: requesting the information about the cell type by using the TRP information type item.

In this possible implementation, the TRP information type item is used to list TRP information requested by the positioning device. Therefore, the positioning device may request the information about the cell type from the access network device by using the TRP information type item. In this way, there is no need to redefine a new information element, and an information element of the TRP information request message is simple. The positioning device requests the information about the cell type by using the TRP information type item in the TRP information request message. That is, a specific request manner is provided. In addition, the TRP information type item lists the TRP information requested by the positioning device, and the TRP information includes information about the cell. The positioning device requests the information about the cell type from the access network device by using the TRP information type item. The positioning device does not need to indicate, by using another indication field or indication instruction, a specific cell or specific cells whose information about a type is specifically requested. Therefore, signaling overheads or bit overheads are reduced.

In another possible implementation, the TRP information response message includes TRP information, and the information about the cell type of the access network device is carried in the TRP information.

In this possible implementation, the access network device sends the information about the cell type to the positioning device by using the TRP information in the TRP information response message. In this way, there is no need to define a new information element, and an information element of the TRP information response message is simple. The access network device uses the TRP information in the TRP information response message to carry the information about the cell type. That is, a specific carrying manner is provided. In addition, the TRP information lists TRP information provided by the access network device for the positioning device, and the TRP information includes information about the cell. Therefore, the information about the cell type is placed in the TRP information, to help the positioning device parse the information about the cell type. The access network device does not need to indicate, by using another indication field or indication instruction, a specific cell or specific cells whose information about a type is specifically provided. Therefore, signaling overheads or bit overheads are reduced.

In another possible implementation, when the cell type includes any one of the following: a macro cell, a micro cell, or a lampsite cell, the request is further used to request indoor or outdoor information of the cell of the access network device.

In this possible implementation, the positioning device may further request the indoor or outdoor information of the cell from the access network device. In this way, the positioning device may more accurately determine an indoor or outdoor situation of the terminal device based on the indoor or outdoor information of the cell and the information about the cell type, to select a more applicable positioning method for the terminal device, so that positioning precision is improved, and positioning performance is improved.

A second aspect of embodiments of this application provides a communication method. The method includes:

An access network device receives a request from a positioning device. The request is used to request information about a cell type of the access network device. The access network device sends the information about the cell type to the positioning device. The cell type includes an indoor cell or an outdoor cell; or the cell type includes any one of the following: a macro cell, a micro cell, or a lampsite cell.

It can be learned from the foregoing solution that the access network device sends the information about the cell type to the positioning device. In this way, the positioning device may select a more applicable positioning method for a terminal device based on the information about the cell type, to improve positioning precision, and improve positioning performance.

In a possible implementation, that an access network device receives a request from a positioning device includes: The access network device receives the request from the positioning device by using a TRP information request message. That the access network device sends the information about the cell type to the positioning device includes: The access network device sends the information about the cell type to the positioning device by using a TRP information response message.

In this possible implementation, the positioning device requests and obtains the information about the cell type from the access network device by using a TRP information request. In this way, there is no need to define a new message, message resources are saved, and practicability of this solution is improved. In addition, TRP information may include information about the cell, to help the access network device parse the request of the positioning device. The positioning device does not need to indicate, by using other indication signaling or another indication field, a specific cell or specific cells whose information about a type is specifically requested. The access network device does not need to indicate, by using another indication instruction or indication field, a specific cell or specific cells whose information about a type is specifically provided, either. Therefore, signaling overheads or bit overheads are reduced.

In another possible implementation, the TRP information request message includes a TRP information type item. That the request is used to request the information about the cell type of the access network device includes: requesting the information about the cell type of the access network device by using the TRP information type item.

In this possible implementation, the TRP information type item is used to list TRP information requested by the positioning device. Therefore, the positioning device may request the information about the cell type from the access network device by using the TRP information type item. In this way, there is no need to redefine a new information element, and an information element of the TRP information request message is simple. The positioning device requests the information about the cell type by using the TRP information type item. That is, a specific request manner is provided. In addition, the TRP information type item lists the TRP information requested by the positioning device, and the TRP information includes information about the cell. Therefore, the positioning device requests the information about the cell type by using the TRP information type item, to help the access network device parse the request of the positioning device. The access network device may understand that the positioning device requests information that is about the cell type and that is included in the TRP information. The positioning device does not need to indicate, by using another indication field or indication instruction, a specific cell or specific cells whose information about a type is specifically requested. Therefore, signaling overheads or bit overheads are reduced.

In another possible implementation, the TRP information response message includes TRP information, and the information about the cell type of the access network device is carried in the TRP information.

In this possible implementation, the access network device sends the information about the cell type to the positioning device by using the TRP information in the TRP information response message. In this way, there is no need to define a new information element, and an information element of the TRP information response message is simple. The access network device uses the TRP information in the TRP information response message to carry the information about the cell type. That is, a specific carrying manner is provided. In addition, the TRP information lists TRP information provided by the access network device for the positioning device, and the TRP information includes information about the cell. Therefore, the information about the cell type is placed in the TRP information. In this way, the positioning device may understand that the information about the cell type is information that is about the cell type and that is included in the TRP information. The access network device does not need to indicate, by using another indication field or indication instruction, a specific cell or specific cells whose information about a type is specifically provided. Therefore, signaling overheads or bit overheads are reduced.

In another possible implementation, when the cell type includes any one of the following: a macro cell, a micro cell, or a lampsite cell, the request is further used to request indoor or outdoor information of the cell of the access network device.

In this possible implementation, the positioning device may further request the indoor or outdoor information of the cell from the access network device. In this way, the positioning device may more accurately determine an indoor or outdoor situation of the terminal device based on the indoor or outdoor information of the cell and the information about the cell type, to select a more applicable positioning method for the terminal device, so that positioning precision is improved, and positioning performance is improved.

A third aspect of embodiments of this application provides a communication method. The method includes:

A positioning device sends a request to an access network device. The request is used to request indoor or outdoor information of a cell of the access network device. The positioning device receives information about a cell type from the access network device.

It can be learned from the foregoing solution that the positioning device obtains the indoor or outdoor information of the cell from the access network device. In this way, the positioning device may select a more applicable positioning method for the terminal device based on the indoor or outdoor information of the cell, to improve positioning precision, and improve positioning performance. For example, the positioning method includes a positioning method based on a radio access technology, and a GNSS positioning method. In a possible implementation, that a positioning device sends a request to an access network device includes: The positioning device sends the request to the access network device by using a TRP information request message. That the positioning device receives the indoor or outdoor information of the cell from the access network device includes: The positioning device receives the indoor or outdoor information of the cell from the access network device by using a TRP information response message.

In this possible implementation, the positioning device requests and obtains the indoor or outdoor information of the cell from the access network device by using a TRP information request. In this way, there is no need to define a new message, message resources are saved, and practicability of this solution is improved. In addition, TRP information may include information about the cell, to help the access network device parse the request of the positioning device. In addition, the positioning device may determine, based on the TRP information, a specific cell whose indoor or outdoor information is the indoor or outdoor information of the cell. The positioning device does not need to indicate, by using other indication signaling or another indication field, a specific cell or specific cells whose indoor or outdoor information is specifically requested. The access network device does not need to indicate, by using another indication instruction or indication field, a specific cell or specific cells whose indoor or outdoor information is specifically provided, either. Therefore, signaling overheads or bit overheads are reduced.

In another possible implementation, the TRP information request message includes a TRP information type item. That the request is used to request the indoor or outdoor information of the cell includes: requesting the indoor or outdoor information of the cell by using the TRP information type item.

In this possible implementation, the TRP information type item is used to list TRP information requested by the positioning device. Therefore, the positioning device may request the indoor or outdoor information of the cell from the access network device by using the TRP information type item. In this way, there is no need to redefine a new information element, and an information element of the TRP information request message is simple. The positioning device requests the indoor or outdoor information of the cell by using the TRP information type item in the TRP information request message. That is, a specific request manner is provided. In addition, the TRP information type item lists the TRP information requested by the positioning device, and the TRP information includes information about the cell. The positioning device requests the indoor or outdoor information of the cell from the access network device by using the TRP information type item. The positioning device does not need to indicate, by using another indication field or indication instruction, a specific cell or specific cells whose indoor or outdoor information is specifically requested. Therefore, signaling overheads or bit overheads are reduced.

In another possible implementation, the TRP information response message includes TRP information, and the indoor or outdoor information of the cell is carried in the TRP information.

In this possible implementation, the access network device sends the indoor or outdoor information of the cell to the positioning device by using the TRP information in the TRP information response message. In this way, there is no need to define a new information element, and an information element of the TRP information response message is simple. The access network device uses the TRP information in the TRP information response message to carry the indoor or outdoor information of the cell. That is, a specific carrying manner is provided. In addition, the TRP information lists TRP information provided by the access network device for the positioning device, and the TRP information includes information about the cell. Therefore, the indoor or outdoor information of the cell is placed in the TRP information, to help the positioning device parse the indoor or outdoor information of the cell. The access network device does not need to indicate, by using another indication field or indication instruction, a specific cell or specific cells whose indoor or outdoor information is specifically provided. Therefore, signaling overheads or bit overheads are reduced.

In another possible implementation, the request is further used to request the information about the cell type of the access network device.

In this possible implementation, the positioning device may further request the information about the cell type of the access network device from the access network device. In this way, the positioning device may more accurately determine an indoor or outdoor situation of the terminal device based on the indoor or outdoor information of the cell and the information about the cell type, to select a more applicable positioning method for the terminal device, so that positioning precision is improved, and positioning performance is improved.

A fourth aspect of embodiments of this application provides a communication method. The method includes:

An access network device receives a request from a positioning device. The request is used to request indoor or outdoor information of a cell of the access network device. The access network device sends the indoor or outdoor information of the cell to the positioning device.

It can be learned from the foregoing solution that the access network device sends the indoor or outdoor information of the cell to the positioning device. In this way, the positioning device may select a more applicable positioning method for the terminal device based on the indoor or outdoor information of the cell, to improve positioning precision, and improve positioning performance. For example, the positioning method includes a positioning method based on a radio access technology, and a GNSS positioning method. In a possible implementation, that an access network device receives a request from a positioning device includes: The access network device receives the request from the positioning device by using a TRP information request message. That the access network device sends the indoor or outdoor information of the cell to the positioning device includes: The access network device sends the indoor or outdoor information of the cell to the positioning device by using a TRP information response message.

In this possible implementation, the positioning device requests and obtains the indoor or outdoor information of the cell from the access network device by using a TRP information request. In this way, there is no need to define a new message, message resources are saved, and practicability of this solution is improved. In addition, TRP information may include information about the cell, to help the access network device parse the request of the positioning device. The positioning device does not need to indicate, by using other indication signaling or another indication field, a specific cell or specific cells whose indoor or outdoor information is specifically requested. The access network device does not need to indicate, by using another indication instruction or indication field, a specific cell or specific cells whose indoor or outdoor information is specifically provided, either. Therefore, signaling overheads or bit overheads are reduced.

In another possible implementation, the TRP information request message includes a TRP information type item. That the request is used to request the indoor or outdoor information of the cell includes: requesting the indoor or outdoor information of the cell by using the TRP information type item.

In this possible implementation, the TRP information type item is used to list TRP information requested by the positioning device. Therefore, the positioning device may request the indoor or outdoor information of the cell from the access network device by using the TRP information type item. In this way, there is no need to redefine a new information element, and an information element of the TRP information request message is simple. The positioning device requests the indoor or outdoor information of the cell by using the TRP information type item. That is, a specific request manner is provided. In addition, the TRP information type item lists the TRP information requested by the positioning device, and the TRP information includes information about the cell. Therefore, the positioning device requests the indoor or outdoor information of the cell by using the TRP information type item, to help the access network device parse the request of the positioning device. The access network device may understand that the positioning device requests indoor or outdoor information that is of the cell and that is included in the TRP information. The positioning device does not need to indicate, by using another indication field or indication instruction, a specific cell or specific cells whose indoor or outdoor information is specifically requested. Therefore, signaling overheads or bit overheads are reduced.

In another possible implementation, the TRP information response message includes TRP information, and the indoor or outdoor information of the cell is carried in the TRP information.

In this possible implementation, the access network device sends the indoor or outdoor information of the cell to the positioning device by using the TRP information in the TRP information response message. In this way, there is no need to define a new information element, and an information element of the TRP information response message is simple. The access network device uses the TRP information in the TRP information response message to carry the indoor or outdoor information of the cell. That is, a specific carrying manner is provided. In addition, the TRP information lists TRP information provided by the access network device for the positioning device, and the TRP information includes information about the cell. Therefore, the information about the cell type is placed in the TRP information. In this way, the positioning device may understand that the indoor or outdoor information of the cell is indoor or outdoor information that is of the cell and that is included in the TRP information. The access network device does not need to indicate, by using another indication field or indication instruction, a specific cell or specific cells whose indoor or outdoor information is specifically provided. Therefore, signaling overheads or bit overheads are reduced.

In another possible implementation, the request is further used to request the information about the cell type of the access network device, and the cell type includes any one of the following: a macro cell, a micro cell, or a lampsite cell.

In this possible implementation, the positioning device may further request the information about the cell type from the access network device. In this way, the positioning device may more accurately determine an indoor or outdoor situation of the terminal device based on the indoor or outdoor information of the cell and the information about the cell type, to select a more applicable positioning method for the terminal device, so that positioning precision is improved, and positioning performance is improved.

A fifth aspect of embodiments of this application provides a communication method. The method includes:

A terminal device receives a request from a positioning device. The request is used to request first information. The first information includes indoor or outdoor information of the terminal device. The terminal device sends the indoor or outdoor information of the terminal device to the positioning device.

It can be learned from the foregoing solution that the terminal device sends the first information to the positioning device. After the positioning device obtains the first information, the positioning device may select a more applicable positioning method for a terminal based on the first information, to improve positioning precision, and improve positioning performance. For example, the positioning method includes a positioning method based on a radio access technology, and a GNSS positioning method.

In a possible implementation, that the request is used to request the first information includes: The request is used to request the terminal device to send the first information to the positioning device when the indoor or outdoor information changes.

In this possible implementation, the positioning device requests the terminal device to send the first information to the positioning device when the indoor or outdoor information changes. The positioning device may select an applicable positioning method for the terminal device in a timely manner based on the first information, to ensure high-precision positioning.

In another possible implementation, that a terminal device receives a request from a positioning device includes: The terminal device receives the request from the positioning device by using a request location information message. That the terminal device sends the first information to the positioning device includes: The terminal device sends the first information to the positioning device by using a provide location information message.

In this possible implementation, the positioning device requests and obtains the first information from the terminal device by using a location information request. In this way, there is no need to define a new message, message resources are saved, and practicability of this solution is improved.

In another possible implementation, the request location information message includes a common information element request location information; and that the request is used to request the first information includes: requesting the first information by using the common information element request location information.

In the implementation, the positioning device requests the first information by using the common information element request location information. There is no need to define a new information element, so that an information element included in the request location information message is simple. The common information element request location information is usually used to list positioning information requested by the positioning device from the terminal device. The positioning device may request the first information by using the common information element request location information. This helps the terminal device parse the request of the positioning device by using the common information element request location information. Then, the terminal device provides the first information for the positioning device.

In another possible implementation, the common information element request location information includes a triggering reporting condition; and the requesting the first information by using the common information element request location information includes: requesting the first information by using the triggering reporting condition.

In the implementation, the positioning device requests the first information by using the triggering reporting condition, and the triggering reporting condition is a sub-information element in the common information element request location information. A manner of requesting the first information is provided. In this way, there is no need to define a new information element, so that an information element structure of the request location information message is simple. Further, the triggering reporting condition usually indicates some network behaviors of the terminal device that occur when the reporting condition is met. Therefore, the positioning device requests the first information by using the triggering reporting condition, so that the terminal device can understand that the first information is reported when the reporting condition is met. In this way, the reporting condition does not need to be additionally indicated by using another indication field or other indication signaling. Therefore, signaling overheads or bit overheads are reduced.

In another possible implementation, the provide location information message includes common information element provide location information, and the first information is carried in the common information element provide location information.

In the implementation, the common information element provide location information is used to list location information provided by the terminal device for the positioning device. Therefore, the terminal device may send the first information to the positioning device by using the common information element provide location information. In this way, there is no need to redefine a new information element, so that an information element structure of the provide location information message is simple. The terminal device provides the first information for the positioning device by using the common information element provide location information, to help the positioning device parse and read the first information.

In another possible implementation, the provide location information message includes new radio enhanced cell identifier provide location information, and the first information is carried in the new radio enhanced cell identifier provide location information.

In the implementation, the new radio enhanced cell identifier provide location information is used to list location information provided by the terminal device for the positioning device. Therefore, the terminal device may report the first information to the positioning device by using the new radio enhanced cell identifier provide location information. In this way, there is no need to redefine a new information element, so that an information element structure of the provide location information message is simple. The terminal device sends the first information to the positioning device by using the new radio enhanced cell identifier provide location information, to help the positioning device parse the first information.

In another possible implementation, the first information further includes indoor or outdoor information of a cell in which the terminal device is located.

In this possible implementation, the positioning device may further request, from the access network device, the indoor or outdoor information of the cell in which the terminal device is located. In this way, the positioning device may more accurately determine an indoor or outdoor situation of the terminal device based on the indoor or outdoor information of the terminal device and the indoor or outdoor information of the cell in which the terminal device is located, to select a more applicable positioning method for the terminal device, so that positioning precision is improved, and positioning performance is improved.

In another possible implementation, the first information further includes information about a type of a cell in which the terminal device is located.

In this possible implementation, the positioning device may further request, from the access network device, the information about the type of the cell in which the terminal device is located. In this way, the positioning device may more accurately determine an indoor or outdoor situation of the terminal device based on the indoor or outdoor information of the terminal device and the information about the type of the cell in which the terminal device is located, to select a more applicable positioning method for the terminal device, so that positioning precision is improved, and positioning performance is improved.

In another possible implementation, the cell type includes any one of the following: an indoor cell or an outdoor cell.

In this possible implementation, the cell in which the terminal device is located may be located indoors, or may be located outdoors. The terminal device notifies, by using the indoor cell or the outdoor cell, the positioning device of the type of the cell in which the terminal device is located.

In another possible implementation, the cell type includes any one of the following: a macro cell, a micro cell, or a lampsite cell.

In this possible implementation, a macro site is usually deployed outdoors, and a small cell, a micro site, and a lamp site are usually deployed indoors. Therefore, the terminal device indirectly notifies, in the implementation, the positioning device of whether the cell in which the terminal device is located is an outdoor cell or an outdoor cell.

A sixth aspect of embodiments of this application provides a communication method. The method includes:

A positioning device sends a request to a terminal device. The request is used to request first information. The first information includes indoor or outdoor information of the terminal device. The positioning device receives the first information from the terminal device.

It can be learned from the foregoing solution that the positioning device obtains the first information from the terminal device. In this way, after the positioning device obtains the first information, the positioning device can select a more applicable positioning method for a terminal based on the first information, to improve positioning precision, and improve positioning performance. For example, the positioning method includes a positioning method based on a radio access technology, and a GNSS positioning method. The GNSS positioning method is more applicable to an outdoor scenario.

In a possible implementation, that the request is used to request the first information includes: The request is used to request the terminal device to send the first information to the positioning device when the indoor or outdoor information changes.

In this possible implementation, the positioning device requests the terminal device to send the first information to the positioning device when the indoor or outdoor information changes. In this way, the positioning device may select an applicable positioning method for the terminal device in a timely manner based on the first information, to ensure high-precision positioning.

In another possible implementation, that a positioning device sends a request to a terminal device includes: The positioning device sends the request to the terminal device by using a request location information message. That the positioning device receives the first information from the terminal device includes: The positioning device receives a provide location information message from the terminal device. The provide location information message includes the first information.

In this possible implementation, the positioning device requests and obtains the first information from the terminal device by using a location information request. In this way, there is no need to define a new message, message resources are saved, and practicability of this solution is improved.

In another possible implementation, the request location information message includes a common information element request location information; and that the request is used to request the first information includes: requesting the first information by using the common information element request location information.

In the implementation, the positioning device requests the first information by using the common information element request location information. There is no need to define a new information element, so that an information element included in the request location information message is simple. The common information element request location information is usually used to list positioning information requested by the positioning device from the terminal device. The positioning device may request the first information by using the common information element request location information. This helps the terminal device parse the request of the positioning device by using the common information element request location information. Then, the terminal device provides the first information for the positioning device.

In another possible implementation, the common information element request location information includes a triggering reporting condition; and the requesting the first information by using the common information element request location information includes: requesting the first information by using the triggering reporting condition.

In the implementation, the positioning device requests the first information by using the triggering reporting condition, and the triggering reporting condition is a sub-information element in the common information element request location information. A manner of requesting the first information is provided. In this way, there is no need to define a new information element, so that an information element structure of the request location information message is simple. Further, the triggering reporting condition usually indicates some network behaviors of the terminal device that occur when the reporting condition is met. Therefore, the positioning device requests the first information from the terminal device by using a triggering reporting condition. Therefore, when the reporting condition is met, the terminal device reports, to the positioning device, information requested by the first information. In this way, reporting condition information of the first information does not need to be additionally indicated by using another indication field or other indication signaling. Therefore, signaling overheads or bit overheads are reduced.

In another possible implementation, the provide location information message includes common information element provide location information, and the first information is carried in the common information element provide location information.

In the implementation, the common information element provide location information is used to list location information provided by the terminal device for the positioning device. Therefore, the terminal device may send the first information to the positioning device by using the common information element provide location information. In this way, there is no need to redefine a new information element, so that an information element structure of the provide location information message is simple. The terminal device provides the first information for the positioning device by using the common information element provide location information, to help the positioning device parse the first information.

In another possible implementation, the provide location information message includes new radio enhanced cell identifier provide location information, and the first information is carried in the new radio enhanced cell identifier provide location information.

In the implementation, the new radio enhanced cell identifier provide location information is used to list location information provided by the terminal device for the positioning device. Therefore, the terminal device may report the first information to the positioning device by using the new radio enhanced cell identifier provide location information. In this way, there is no need to redefine a new information element, so that an information element structure of the provide location information message is simple. The terminal device provides the first information for the positioning device by using the new radio enhanced cell identifier provide location information, to help the positioning device parse the first information.

In another possible implementation, the first information further includes indoor or outdoor information of a cell in which the terminal device is located.

In this possible implementation, the positioning device may further request, from the access network device, the indoor or outdoor information of the cell in which the terminal device is located. In this way, the positioning device may more accurately determine an indoor or outdoor situation of the terminal device based on the indoor or outdoor information of the terminal device and the indoor or outdoor information of the cell in which the terminal device is located, to select a more applicable positioning method for the terminal device, so that positioning precision is improved, and positioning performance is improved.

In another possible implementation, the first information further includes information about a type of a cell in which the terminal device is located.

In this possible implementation, the positioning device may further request, from the access network device, the information about the type of the cell in which the terminal device is located. The positioning device may more accurately determine an indoor or outdoor situation of the terminal device based on the indoor or outdoor information of the terminal device and the information about the type of the cell in which the terminal device is located, to select a more applicable positioning method for the terminal device, so that positioning precision is improved, and positioning performance is improved.

In another possible implementation, the type of the cell in which the terminal device is located includes any one of the following: an indoor cell or an outdoor cell.

In this possible implementation, the cell in which the terminal device is located may be deployed indoors, or may be deployed outdoors. The terminal device notifies, by using the indoor cell or the outdoor cell, the positioning device of the type of the cell in which the terminal device is located.

In another possible implementation, the type of the cell in which the terminal device is located includes any one of the following: a macro cell, a micro cell, or a lampsite cell.

In this possible implementation, a macro site is usually deployed outdoors, and a small cell, a micro site, and a lamp site are usually deployed indoors. Therefore, the terminal device indirectly notifies, in the implementation, the positioning device of whether the cell in which the terminal device is located is an outdoor cell or an outdoor cell.

A seventh aspect of embodiments of this application provides a communication method. The method includes:

A terminal device receives a request message from a positioning device. The request message is used to request a GNSS measurement quantity or a GNSS positioning location. The terminal device sends a reply message to the positioning device. The reply message includes second information, and the second information indicates that the terminal device is/is not applicable to GNSS measurement.

It can be learned from the foregoing solution that the positioning device obtains the second information. In this way, the positioning device may select a more applicable positioning method for a terminal device based on the second information, so that positioning precision is improved, and positioning performance is improved. For example, the positioning method includes a positioning method based on a radio access technology, and a GNSS positioning method.

In a possible implementation, the second information includes indoor or outdoor information of the terminal device.

In this possible implementation, after the positioning device obtains the indoor or outdoor information of the terminal device, the positioning device may select a more applicable positioning method for the terminal device based on the indoor or outdoor information of the terminal device. For example, because an indoor GNSS signal is weak, if the terminal device is located indoors, the positioning device may reselect the positioning method based on the radio access technology for the terminal device. If the terminal device is located outdoors, quality of the GNSS signal is good. Therefore, the positioning device may keep positioning the terminal device in the GNSS positioning method.

In another possible implementation, the second information includes information about a type of a cell in which the terminal device is located; and the cell type includes any one of the following: an indoor cell or an outdoor cell; or the cell type includes any one of the following: a macro cell, a micro cell, or a lampsite cell.

In this possible implementation, after the positioning device obtains the information about the type of the cell in which the terminal device is located, the positioning device may select a more applicable positioning method for the terminal device based on the information about the type of the cell in which the terminal device is located. In addition, in two provided possible implementations of the cell type, a macro site is usually deployed outdoors, and a small cell, a micro site, and a lamp site are usually deployed indoors. Therefore, the terminal device indirectly notifies, in the implementation, the positioning device of whether the cell in which the terminal device is located is an outdoor cell or an outdoor cell. Alternatively, the cell in which the terminal device is located may be deployed indoors, or may be deployed outdoors. The terminal device notifies, by using the indoor cell or the outdoor cell, the positioning device of the type of the cell in which the terminal device is located.

In another possible implementation, the second information includes indoor or outdoor information of a cell in which the terminal device is located.

In this possible implementation, after the positioning device obtains the indoor or outdoor information of the cell in which the terminal device is located, the positioning device may select a more applicable positioning method for the terminal device based on the indoor or outdoor information of the cell in which the terminal device is located.

In another possible implementation, the second information includes quality information of the GNSS measurement quantity.

In this possible implementation, after the positioning device obtains the quality information of the GNSS measurement quantity, the positioning device may select a more applicable positioning method for the terminal device based on the quality information of the GNSS measurement quantity. For example, the quality information of the GNSS measurement quantity indicates that measurement precision of the GNSS measurement quantity is high or a measurement result is accurate, and the positioning device may keep positioning the terminal device in the GNSS positioning method.

In another possible implementation, the second information includes availability of the GNSS measurement quantity.

In this possible implementation, after the positioning device obtains the availability of the GNSS measurement quantity, the positioning device may select a more applicable positioning method for the terminal device based on the availability of the GNSS measurement quantity. For example, the availability of the GNSS measurement quantity is high, and the positioning device may keep positioning the terminal device in the GNSS positioning method.

In another possible implementation, the second information includes reliability of the GNSS positioning location.

In this possible implementation, after the positioning device obtains the reliability of the GNSS positioning location, the positioning device may select a more applicable positioning method for the terminal device based on the reliability of the GNSS positioning location.

In another possible implementation, the second information includes whether strength of the GNSS signal is greater than a preset threshold.

In this possible implementation, after the positioning device learns of whether the strength of the GNSS signal is greater than the preset threshold, the positioning device may select a more applicable positioning method for the terminal device based on whether the strength of the GNSS signal is greater than the preset threshold. For example, when the strength of the GNSS signal is greater than the preset threshold, the positioning device may determine that the strength of the GNSS signal received by the terminal device is large, and the positioning device may keep positioning the terminal device in the GNSS positioning method.

In another possible implementation, the second information includes a quantity of visible satellites.

In this possible implementation, after the positioning device obtains the quantity of visible satellites, the positioning device may select a more applicable positioning method for the terminal device based on the quantity of visible satellites. For example, if the quantity of visible satellites is greater than 4, the positioning device may keep positioning the terminal device in the GNSS positioning method.

In another possible implementation, the request message includes third information, and the third information is used to request the second information.

In this possible implementation, the positioning device requests the second information from the terminal device by using the third information included in the request message. The terminal device may provide the second information for the positioning device based on the third information. After obtaining the second information, the positioning device may select an applicable positioning method for the terminal device based on the second information, to ensure high-precision positioning.

In another possible implementation, the request message is a request location information message, and the reply message is a provide location information message.

In this possible implementation, the positioning device requests and obtains the second information from the terminal device by using a location information request. In this way, there is no need to define a new message, message resources are saved, and practicability of this solution is improved.

In another possible implementation, the request location information message includes GNSS request location information. That the third information is used to request the second information includes: requesting the second information by using the GNSS request location information.

In this possible implementation, the positioning device requests the second information by using the GNSS request location information. The GNSS request location information is an information element in the request location information message. That is, a manner of requesting the second information is provided. In this way, there is no need to define a new information element, so that an information element structure of the request location information message is simple. The GNSS request location information is usually used to list location information requested by the positioning device from the terminal device. Therefore, the positioning device may request the second information by using the GNSS request location information, to help the terminal device parse the request of the positioning device.

In another possible implementation, the provide location information message includes GNSS provide location information. The second information is carried in the GNSS provide location information.

In the implementation, the positioning device uses an information element in the provide location information message to carry the second information, there is no need to redefine a new information element, and an information element structure of the provide location information message is simple. In addition, the GNSS provide location information lists location information provided by the terminal device for the positioning device. Therefore, the terminal device may send the second information to the positioning device by using the GNSS provide location information. This helps the positioning device parse the second information.

An eighth aspect of embodiments of this application provides a communication method. The method includes:

A positioning device sends a request message to a terminal device. The request message is used to request a GNSS measurement quantity or a GNSS positioning location. The positioning device receives a reply message from the terminal device. The reply message includes second information, and the second information indicates that the terminal device is/is not applicable to GNSS measurement.

It can be learned from the foregoing solution that the positioning device obtains the second information. In this way, the positioning device may select a more applicable positioning method for a terminal device based on the second information, so that positioning precision is improved, and positioning performance is improved.

In a possible implementation, the second information includes indoor or outdoor information of the terminal device.

In this possible implementation, after the positioning device obtains the indoor or outdoor information of the terminal device, the positioning device may select a more applicable positioning method for the terminal device based on the indoor or outdoor information of the terminal device. For example, because an indoor GNSS signal is weak, if the terminal device is located indoors, the positioning device may reselect the positioning method based on the radio access technology for the terminal device. If the terminal device is located outdoors, quality of the GNSS signal is good. Therefore, the positioning device may keep positioning the terminal device in the GNSS positioning method.

In another possible implementation, the second information includes information about a type of a cell in which the terminal device is located; and the cell type includes any one of the following: an indoor cell or an outdoor cell; or the cell type includes any one of the following: a macro cell, a micro cell, or a lampsite cell.

In this possible implementation, after the positioning device obtains the information about the type of the cell in which the terminal device is located, the positioning device may select a more applicable positioning method for the terminal device based on the information about the type of the cell in which the terminal device is located. In addition, in two provided possible implementations of the cell type, a macro site is usually deployed outdoors, and a small cell, a micro site, and a lamp site are usually deployed indoors. Therefore, the terminal device indirectly notifies, in the implementation, the positioning device of whether the cell in which the terminal device is located is an outdoor cell or an outdoor cell. Alternatively, the cell in which the terminal device is located may be deployed indoors, or may be deployed outdoors. The terminal device notifies, by using the indoor cell or the outdoor cell, the positioning device of the type of the cell in which the terminal device is located.

In another possible implementation, the second information includes indoor or outdoor information of a cell in which the terminal device is located.

In this possible implementation, after the positioning device obtains the indoor or outdoor information of the cell in which the terminal device is located, the positioning device may select a more applicable positioning method for the terminal device based on the indoor or outdoor information of the cell in which the terminal device is located.

In another possible implementation, the second information includes quality information of the GNSS measurement quantity.

In this possible implementation, after the positioning device obtains the quality information of the GNSS measurement quantity, the positioning device may select a more applicable positioning method for the terminal device based on the quality information of the GNSS measurement quantity. For example, the quality information of the GNSS measurement quantity indicates that measurement precision of the GNSS measurement quantity is high or a measurement result is accurate, and the positioning device may keep positioning the terminal device in the GNSS positioning method.

In another possible implementation, the second information includes availability of the GNSS measurement quantity.

In this possible implementation, after the positioning device obtains the availability of the GNSS measurement quantity, the positioning device may select a more applicable positioning method for the terminal device based on the availability of the GNSS measurement quantity. For example, the availability of the GNSS measurement quantity is high, and the positioning device may keep positioning the terminal device in the GNSS positioning method.

In another possible implementation, the second information includes reliability of the GNSS positioning location.

In this possible implementation, after the positioning device obtains the reliability of the GNSS positioning location, the positioning device may select a more applicable positioning method for the terminal device based on the reliability of the GNSS positioning location.

In another possible implementation, the second information includes whether strength of the GNSS signal is greater than a preset threshold.

In this possible implementation, after the positioning device learns of whether the strength of the GNSS signal is greater than the preset threshold, the positioning device may select a more applicable positioning method for the terminal device based on whether the strength of the GNSS signal is greater than the preset threshold. For example, when the strength of the GNSS signal is greater than the preset threshold, the positioning device may determine that the strength of the GNSS signal received by the terminal device is large, and the positioning device may keep positioning the terminal device in the GNSS positioning method.

In another possible implementation, the second information includes a quantity of visible satellites.

In this possible implementation, after the positioning device obtains the quantity of visible satellites, the positioning device may select a more applicable positioning method for the terminal device based on the quantity of visible satellites. For example, if the quantity of visible satellites is greater than 4, the positioning device may keep positioning the terminal device in the GNSS positioning method.

In another possible implementation, the request message includes third information, and the third information is used to request the second information.

In this possible implementation, the positioning device requests the second information from the terminal device by using the third information included in the request message. The terminal device may provide the second information for the positioning device based on the third information. After obtaining the second information, the positioning device may select an applicable positioning method for the terminal device based on the second information, to ensure high-precision positioning.

In another possible implementation, the request message is a request location information message, and the reply message is a provide location information message.

In this possible implementation, the positioning device requests and obtains the second information from the terminal device by using a location information request. In this way, there is no need to define a new message, to improve practicability of this solution. The positioning device requests the second information from the terminal device in a process of positioning the terminal device, to save message resources, and improve practicability of this solution.

In another possible implementation, the request location information message includes GNSS request location information. That the third information is used to request the second information includes: requesting the second information by using the GNSS request location information.

In this possible implementation, the positioning device requests the second information by using the GNSS request location information. The GNSS request location information is an information element in the request location information message. That is, a manner of requesting the second information is provided. In this way, there is no need to define a new information element, so that an information element structure of the request location information message is simple. The GNSS request location information is usually used to list location information requested by the positioning device from the terminal device. Therefore, the positioning device may request the second information by using the GNSS request location information, to help the terminal device parse the request of the positioning device.

In another possible implementation, the provide location information message includes GNSS provide location information. The second information is carried in the GNSS provide location information.

In the implementation, the positioning device uses an information element in the provide location information message to carry the second information, there is no need to redefine a new information element, and an information element structure of the provide location information message is simple. In addition, the GNSS provide location information lists location information provided by the terminal device for the positioning device. Therefore, the terminal device may send the second information to the positioning device by using the GNSS provide location information. This helps the positioning device parse the second information.

A ninth aspect of embodiments of this application provides a communication method. The method includes:

A positioning device sends a request to an access network device. The request is used to request first information. The first information includes indoor or outdoor information of the terminal device. The positioning device receives the first information from the access network device.

It can be learned from the foregoing solution that the positioning device obtains the first information from the access network device. In this way, the positioning device may select a more applicable positioning method for the terminal device based on the first information, to improve positioning precision, and improve positioning performance. For example, the positioning method includes a positioning method based on a radio access technology, and a GNSS positioning method.

In a possible implementation, that a positioning device sends a request to an access network device includes: The positioning device sends the request to the access network device by using a positioning information request message. That the positioning device receives the first information from the access network device includes: The positioning device receives a positioning information response message from the access network device. The positioning information response message includes the first information.

In this implementation, the positioning device requests and obtains the first information from the access network device by using a positioning information request. In this way, there is no need to define a new message, message resources are saved, and practicability of this solution is improved.

In another possible implementation, that the request is used to request the first information includes: The request is used to request the access network device to send the first information to the positioning device when the indoor or outdoor information of the terminal device changes.

In this possible implementation, the positioning device requests the access network device to send the first information to the positioning device when the indoor or outdoor information of the terminal device changes, to help the positioning device determine the first information. This helps the positioning device select an applicable positioning method for the terminal device in a timely manner based on the first information, to ensure high-precision positioning.

In another possible implementation, the method further includes: The positioning device receives a positioning information update message from the access network device when the indoor or outdoor information of the terminal device changes. The positioning information update message includes changed first information.

In this implementation, the indoor or outdoor information of the terminal device changes, and the positioning device may obtain the changed first information by using the positioning information update message. This helps the positioning device select an applicable positioning method for the terminal device in a timely manner based on the changed first information, to ensure high-precision positioning. In addition, a specific manner of carrying the changed first information is provided.

In another possible implementation, the first information further includes indoor or outdoor information of a cell in which the terminal device is located.

In this possible implementation, the positioning device may further request, from the access network device, the indoor or outdoor information of the cell in which the terminal device is located. In this way, the positioning device may more accurately determine an indoor or outdoor situation of the terminal device based on the indoor or outdoor information of the terminal device and the indoor or outdoor information of the cell in which the terminal device is located, to select a more applicable positioning method for the terminal device, so that positioning precision is improved, and positioning performance is improved.

In another possible implementation, the first information further includes information about a type of a cell in which the terminal device is located.

In this possible implementation, the positioning device may further request, from the access network device, the information about the type of the cell in which the terminal device is located. In this way, the positioning device may more accurately determine an indoor or outdoor situation of the terminal device based on the indoor or outdoor information of the terminal device and the information about the type of the cell in which the terminal device is located, to select a more applicable positioning method for the terminal device, so that positioning precision is improved, and positioning performance is improved.

In another possible implementation, the type of the cell in which the terminal device is located includes any one of the following: an indoor cell or an outdoor cell.

In this possible implementation, the cell of the access network device may be deployed indoors, or may be deployed outdoors. The access network device notifies the positioning device of a type of each cell of the access network device by using the indoor cell or the outdoor cell.

In another possible implementation, the type of the cell in which the terminal device is located includes any one of the following: a macro cell, a micro cell, or a lampsite cell.

In this possible implementation, a macro site is usually deployed outdoors, and a small cell, a micro site, and a lamp site are usually deployed indoors. Therefore, the access network device indirectly notifies, in the implementation, the positioning device of whether the cell is an outdoor cell or an outdoor cell.

A tenth aspect of embodiments of this application provides a communication method. The method includes:

An access network device receives a request from a positioning device. The request is used to request first information. The first information includes indoor or outdoor information of a terminal device. The access network device sends the first information to the positioning device.

It can be learned from the foregoing solution that the access network device sends the first information to the positioning device. In this way, the positioning device may select a more applicable positioning method for the terminal device based on the first information, to improve positioning precision, and improve positioning performance. For example, the positioning method includes a positioning method based on a radio access technology, and a GNSS positioning method.

In a possible implementation, that an access network device receives a request from a positioning device includes: The access network device receives the request from the positioning device by using a positioning information request message. That the access network device sends the first information to the positioning device includes: The access network device sends a positioning information response message to the positioning device. The positioning information response message includes the first information.

In this implementation, the positioning device requests and obtains the first information from the access network device by using a positioning information request. In this way, there is no need to define a new message, message resources are saved, and practicability of this solution is improved.

In another possible implementation, that the request is used to request the first information includes: The request is used to request the access network device to send the first information to the positioning device when the indoor or outdoor information of the terminal device changes.

In this possible implementation, the access network device sends the first information to the positioning device when the indoor or outdoor information of the terminal device changes, to help the positioning device determine the first information. This helps the positioning device select an applicable positioning method for the terminal device in a timely manner based on the first information, to ensure high-precision positioning.

In another possible implementation, the method further includes: The access network device sends a positioning information update message to the positioning device when the indoor or outdoor information of the terminal device changes. The positioning information update message includes changed first information.

In this implementation, the access network device may send the changed first information to the positioning device by using the positioning information update message. This helps the positioning device select an applicable positioning method for the terminal device in a timely manner based on the changed first information, to ensure high-precision positioning. In addition, a specific manner of carrying the changed first information is provided.

In another possible implementation, the first information further includes indoor or outdoor information of a cell in which the terminal device is located.

In this possible implementation, the positioning device may further request, from the access network device, the indoor or outdoor information of the cell in which the terminal device is located. In this way, the positioning device may more accurately determine an indoor or outdoor situation of the terminal device based on the indoor or outdoor information of the terminal device and the indoor or outdoor information of the cell in which the terminal device is located, to select a more applicable positioning method for the terminal device, so that positioning precision is improved, and positioning performance is improved.

In another possible implementation, the first information further includes information about a type of a cell in which the terminal device is located.

In this possible implementation, the positioning device may further request, from the access network device, the information about the type of the cell in which the terminal device is located. In this way, the positioning device may more accurately determine an indoor or outdoor situation of the terminal device based on the indoor or outdoor information of the terminal device and the information about the type of the cell in which the terminal device is located, to select a more applicable positioning method for the terminal device, so that positioning precision is improved, and positioning performance is improved.

In another possible implementation, the type of the cell in which the terminal device is located includes any one of the following: an indoor cell or an outdoor cell.

In this possible implementation, the cell of the access network device may be deployed indoors, or may be deployed outdoors. The access network device notifies the positioning device of a type of each cell of the access network device by using the indoor cell or the outdoor cell.

In another possible implementation, the type of the cell in which the terminal device is located includes any one of the following: a macro cell, a micro cell, or a lampsite cell.

In this possible implementation, a macro site is usually deployed outdoors, and a small cell, a micro site, and a lamp site are usually deployed indoors. Therefore, the access network device indirectly notifies, in the implementation, the positioning device of whether the cell is an outdoor cell or an outdoor cell.

An eleventh aspect of embodiments of this application provides a communication apparatus. The communication apparatus includes:

a sending unit, configured to send a request to an access network device, where the request is used to request information about a cell type of the access network device, where the cell type includes an indoor cell or an outdoor cell; or the cell type includes any one of the following: a macro cell, a micro cell, or a lampsite cell; and a receiving unit, configured to receive the information about the cell type from the access network device.

In a possible implementation, the sending unit is specifically configured to send the request to the access network device by using a TRP information request message; and the receiving unit is specifically configured to receive a TRP information response message from the access network device. The TRP information response message includes the information about the cell type.

In another possible implementation, the TRP information request message includes a TRP information type item, and that the request is used to request the information about the cell type of the access network device includes: requesting the information about the cell type of the access network device by using the TRP information type item.

In another possible implementation, the TRP information response message includes TRP information, and the information about the cell type of the access network device is carried in the TRP information.

In another possible implementation, when the cell type includes any one of the following: a macro cell, a micro cell, or a lampsite cell, the request is further used to request indoor or outdoor information of the cell of the access network device.

For technical effects brought by the eleventh aspect, refer to the technical effects brought by the first aspect. For technical effects brought by any possible implementation of the eleventh aspect, refer to the technical effects brought by any possible implementation of the first aspect.

A twelfth aspect of embodiments of this application provides a communication apparatus. The communication apparatus includes:

a receiving unit, configured to receive a request from a positioning device, where the request is used to request information about a cell type of an access network device; and the cell type includes an indoor cell or an outdoor cell; or the cell type includes any one of the following: a macro cell, a micro cell, or a lampsite cell; and a sending unit, configured to send the information about the cell type to the positioning device.

In a possible implementation, the receiving unit is specifically configured to receive the request from positioning by using a TRP information request message. The sending unit is specifically configured to send a TRP information response message to the positioning device. The TRP information response message includes the information about the cell type.

In another possible implementation, the TRP information request message includes a TRP information type item, and that the request is used to request the information about the cell type of the access network device includes: requesting the information about the cell type by using the TRP information type item.

In another possible implementation, the TRP information response message includes TRP information, and the information about the cell type of the access network device is carried in the TRP information.

In another possible implementation, when the cell type includes any one of the following: a macro cell, a micro cell, or a lampsite cell, the request is further used to request indoor or outdoor information of the cell of the access network device.

For technical effects brought by the twelfth aspect, refer to the technical effects brought by the second aspect. For technical effects brought by any possible implementation of the twelfth aspect, refer to the technical effects brought by any possible implementation of the second aspect.

A thirteenth aspect of embodiments of this application provides a communication apparatus. The communication apparatus includes:

a sending unit, configured to send a request to an access network device, where the request is used to request indoor or outdoor information of a cell of the access network device; and a receiving unit, configured to receive the indoor or outdoor information of the cell from the access network device.

In a possible implementation, the sending unit is specifically configured to send the request to the access network device by using a TRP information request message; and the receiving unit is specifically configured to receive a TRP information response message from the access network device. The TRP information response message includes the indoor or outdoor information of the cell.

In another possible implementation, the TRP information request message includes a TRP information type item, and that the request is used to request the indoor or outdoor information of the cell includes: requesting the indoor or outdoor information of the cell by using the TRP information type item.

In another possible implementation, the TRP information response message includes TRP information, and the indoor or outdoor information of the cell is carried in the TRP information.

In another possible implementation, the request is further used to request the information about the cell type of the access network device.

In another possible implementation, the cell type includes an indoor cell or an outdoor cell.

In another possible implementation, the cell type includes any one of the following: a macro cell, a micro cell, or a lampsite cell.

For technical effects brought by the thirteenth aspect, refer to the technical effects brought by the third aspect. For technical effects brought by any possible implementation of the thirteenth aspect, refer to the technical effects brought by any possible implementation of the third aspect.

A fourteenth aspect of embodiments of this application provides a communication apparatus. The communication apparatus includes:

a receiving unit, configured to receive a request from a positioning device, where the request is used to request indoor or outdoor information of a cell of an access network device; and a sending unit, configured to send the indoor or outdoor information of the cell to the positioning device.

In a possible implementation, the receiving unit is specifically configured to receive the request from positioning by using a TRP information request message. The sending unit is specifically configured to send a TRP information response message to the positioning device. The TRP information response message includes the indoor or outdoor information of the cell.

In another possible implementation, the TRP information request message includes a TRP information type item, and that the request is used to request the indoor or outdoor information of the cell includes: requesting the indoor or outdoor information of the cell by using the TRP information type item.

In another possible implementation, the TRP information response message includes TRP information, and the indoor or outdoor information of the cell is carried in the TRP information.

In another possible implementation, the request is further used to request the information about the cell type of the access network device.

In another possible implementation, the cell type includes an indoor cell or an outdoor cell.

In another possible implementation, the cell type includes any one of the following: a macro cell, a micro cell, or a lampsite cell.

For technical effects brought by the fourteenth aspect, refer to the technical effects brought by the fourth aspect. For technical effects brought by any possible implementation of the fourteenth aspect, refer to the technical effects brought by any possible implementation of the fourth aspect.

A fifteenth aspect of embodiments of this application provides a communication apparatus. The communication apparatus includes:

a receiving unit, configured to receive a request from a positioning device, where the request is used to request first information, and the first information includes indoor or outdoor information of the communication apparatus; and a sending unit, configured to send the first information to the positioning device.

In a possible implementation, that the request is used to request the first information includes: The request is used to request the communication apparatus to send the first information to the positioning device when the indoor or outdoor information changes.

In another possible implementation, the receiving unit is specifically configured to receive the request from the positioning device by using a request location information message. The sending unit is specifically configured to send a provide location information message to the positioning device. The provide location information message includes the first information.

In another possible implementation, the request location information message includes a common information element request location information; and that the request is used to request the first information includes: requesting the first information by using the common information element request location information.

In another possible implementation, the common information element request location information includes a triggering reporting condition; and the requesting the first information by using the common information element request location information includes: requesting the first information by using the triggering reporting condition.

In another possible implementation, the provide location information message includes common information element provide location information, and the first information is carried in the common information element provide location information.

In another possible implementation, the provide location information message includes new radio enhanced cell identifier provide location information, and the first information is carried in the new radio enhanced cell identifier provide location information.

In another possible implementation, the first information further includes indoor or outdoor information of a cell in which a terminal device is located.

In another possible implementation, the first information further includes information about a type of a cell in which a terminal device is located.

In another possible implementation, the cell type includes any one of the following: an indoor cell or an outdoor cell.

In another possible implementation, the cell type includes any one of the following: a macro cell, a micro cell, or a lampsite cell.

For technical effects brought by the fifteenth aspect, refer to the technical effects brought by the fifth aspect. For technical effects brought by any possible implementation of the fifteenth aspect, refer to the technical effects brought by any possible implementation of the fifth aspect.

A sixteenth aspect of embodiments of this application provides a communication apparatus. The communication apparatus includes:

a sending unit, configured to send a request to a terminal device, where the request is used to request first information, and the first information includes indoor or outdoor information of the terminal device; and a receiving unit, configured to receive the first information from the terminal device.

In a possible implementation, that the request is used to request the first information includes: The request is used to request the terminal device to send the first information to the positioning device when the indoor or outdoor information changes.

In another possible implementation, the sending unit is specifically configured to send the request to the terminal device by using a request location information message. The receiving unit is specifically configured to receive a provide location information message from the terminal device. The provide location information message includes the first information.

In another possible implementation, the request location information message includes a common information element request location information; and that the request is used to request the first information includes: requesting the first information by using the common information element request location information.

In another possible implementation, the common information element request location information includes a triggering reporting condition; and the requesting the first information by using the common information element request location information includes: requesting the first information by using the triggering reporting condition.

In another possible implementation, the provide location information message includes common information element provide location information, and the first information is carried in the common information element provide location information.

In another possible implementation, the provide location information message includes new radio enhanced cell identifier provide location information, and the first information is carried in the new radio enhanced cell identifier provide location information.

In another possible implementation, the first information further includes indoor or outdoor information of a cell in which the terminal device is located.

In another possible implementation, the first information further includes information about a type of a cell in which the terminal device is located.

In another possible implementation, the type of the cell in which the terminal device is located includes any one of the following: an indoor cell or an outdoor cell.

In another possible implementation, the type of the cell in which the terminal device is located includes any one of the following: a macro cell, a micro cell, or a lampsite cell.

For technical effects brought by the sixteenth aspect, refer to the technical effects brought by the sixth aspect. For technical effects brought by any possible implementation of the sixteenth aspect, refer to the technical effects brought by any possible implementation of the sixth aspect.

A seventeenth aspect of embodiments of this application provides a communication apparatus. The communication apparatus includes:

a receiving unit, configured to receive a request message from a positioning device, where the request message is used to request a GNSS measurement quantity or a GNSS positioning location; and a sending unit, configured to send a reply message to the positioning device, where the reply message includes second information, and the second information indicates whether a terminal device is/is not applicable to GNSS measurement.

In a possible implementation, the second information includes indoor or outdoor information of the terminal device.

In another possible implementation, the second information includes information about a type of a cell in which the terminal device is located; and the cell type includes any one of the following: an indoor cell or an outdoor cell; or the cell type includes any one of the following: a macro cell, a micro cell, or a lampsite cell.

In another possible implementation, the second information includes indoor or outdoor information of a cell in which the terminal device is located.

In another possible implementation, the second information includes quality information of the GNSS measurement quantity.

In another possible implementation, the second information includes availability of the GNSS measurement quantity.

In another possible implementation, the second information includes reliability of the GNSS positioning location.

In another possible implementation, the second information includes whether strength of the GNSS signal is greater than a preset threshold.

In another possible implementation, the second information includes a quantity of visible satellites.

In another possible implementation, the request message includes third information, and the third information is used to request the second information.

In another possible implementation, the request message is a request location information message, and the reply message is a provide location information message.

In another possible implementation, the request location information message includes a GNSS request location information, and that the third information is used to request the second information includes: requesting the second information by using the GNSS request location information.

In another possible implementation, the provide location information message includes GNSS provide location information, and the second information is carried in the GNSS provide location information.

For technical effects brought by the seventeenth aspect, refer to the technical effects brought by the seventh aspect. For technical effects brought by any possible implementation of the seventeenth aspect, refer to the technical effects brought by any possible implementation of the seventh aspect.

An eighteenth aspect of embodiments of this application provides a communication apparatus. The communication apparatus includes:

a sending unit, configured to send a request message to a terminal device, where the request message is used to request a GNSS measurement quantity or a GNSS positioning location; and a receiving unit, configured to receive a reply message from the terminal device, where the reply message includes second information, and the second information indicates whether a terminal is/is not applicable to GNSS measurement.

In a possible implementation, the second information includes indoor or outdoor information of the terminal device.

In another possible implementation, the second information includes information about a type of a cell in which the terminal device is located; and the cell type includes any one of the following: an indoor cell or an outdoor cell; or the cell type includes any one of the following: a macro cell, a micro cell, or a lampsite cell.

In another possible implementation, the second information includes indoor or outdoor information of a cell in which the terminal device is located.

In another possible implementation, the second information includes quality information of the GNSS measurement quantity.

In another possible implementation, the second information includes availability of the GNSS measurement quantity.

In another possible implementation, the second information includes reliability of the GNSS positioning location.

In another possible implementation, the second information includes whether strength of the GNSS signal is greater than a preset threshold.

In another possible implementation, the second information includes a quantity of visible satellites.

In another possible implementation, the request message includes third information, and the third information is used to request the second information.

In another possible implementation, the request message is a request location information message, and the reply message is a provide location information message.

In another possible implementation, the request location information message includes a GNSS request location information, and that the third information is used to request the second information includes: requesting the second information by using the GNSS request location information.

In another possible implementation, the provide location information message includes GNSS provide location information, and the second information is carried in the GNSS provide location information.

For technical effects brought by the eighteenth aspect, refer to the technical effects brought by the eighth aspect. For technical effects brought by any possible implementation of the eighteenth aspect, refer to the technical effects brought by any possible implementation of the eighth aspect.

A nineteenth aspect of embodiments of this application provides a communication apparatus. The communication apparatus includes:

a sending unit, configured to send a request to an access network device, where the request is used to request first information, and the first information includes indoor or outdoor information of a terminal device; and a receiving unit, configured to receive the first information from the access network device.

In a possible implementation, the sending unit is specifically configured to send the request to the access network device by using a positioning information request message. The receiving unit is specifically configured to receive a positioning information response message from the access network device. The positioning information response message includes the first information.

In another possible implementation, that the request is used to request the first information includes: The request is used to request the access network device to send the first information to the positioning device when the indoor or outdoor information of the terminal device changes.

In another possible implementation, the receiving unit is further configured to receive a positioning information update message from the access network device when the indoor or outdoor information of the terminal device changes. The positioning information update message includes changed first information.

In another possible implementation, the first information further includes indoor or outdoor information of a cell in which the terminal device is located.

In another possible implementation, the first information further includes information about a type of a cell in which the terminal device is located.

In another possible implementation, the type of the cell in which the terminal device is located includes any one of the following: an indoor cell or an outdoor cell.

In another possible implementation, the type of the cell in which the terminal device is located includes any one of the following: a macro cell, a micro cell, or a lampsite cell.

For technical effects brought by the nineteenth aspect, refer to the technical effects brought by the ninth aspect. For technical effects brought by any possible implementation of the nineteenth aspect, refer to the technical effects brought by any possible implementation of the ninth aspect.

A twentieth aspect of embodiments of this application provides a communication apparatus. The communication apparatus includes:

a receiving unit, configured to receive a request from a positioning device, where the request is used to request first information, and the first information includes indoor or outdoor information of a terminal device; and a sending unit, configured to send the first information to the positioning device.

In a possible implementation, the receiving unit is specifically configured to receive the request from the positioning device by using a positioning information request message. The sending unit is specifically configured to send a positioning information response message to the positioning device. The positioning information response message includes the first information.

In another possible implementation, that the request is used to request the first information includes: The request is used to request the access network device to send the first information to the positioning device when the indoor or outdoor information of the terminal device changes.

In another possible implementation, the sending unit is specifically configured to send a positioning information update message to the positioning device when the indoor or outdoor information of the terminal device changes. The positioning information update message includes changed first information.

In another possible implementation, the first information further includes indoor or outdoor information of a cell in which the terminal device is located.

In another possible implementation, the first information further includes information about a type of a cell in which the terminal device is located.

In another possible implementation, the type of the cell in which the terminal device is located includes any one of the following: an indoor cell or an outdoor cell.

In another possible implementation, the type of the cell in which the terminal device is located includes any one of the following: a macro cell, a micro cell, or a lampsite cell.

For technical effects brought by the twentieth aspect, refer to the technical effects brought by the tenth aspect. For technical effects brought by any possible implementation of the twentieth aspect, refer to the technical effects brought by any possible implementation of the tenth aspect.

A twenty-first aspect of embodiments of this application provides a communication apparatus. The communication apparatus includes a processor and a memory. The memory stores a computer program, and the processor is further configured to invoke and run the computer program stored in the memory, so that the processor implements any implementation of any one of the first aspect to the tenth aspect.

Optionally, the communication apparatus includes a transceiver, and the processor is configured to control the transceiver to perform any implementation of any one of the first aspect to the tenth aspect.

For technical effects brought by a twenty-second aspect, refer to the technical effects brought by different possible implementations of the first aspect to the tenth aspect.

A twenty-third aspect of embodiments of this application provides a computer program product including computer instructions. When the computer program product runs on a computer, the computer is enabled to perform any implementation of the first aspect to the tenth aspect.

A twenty-fourth aspect of embodiments of this application provides a computer-readable storage medium, including computer instructions. When the computer instructions run on a computer, the computer is enabled to perform any implementation of the first aspect to the tenth aspect.

A twenty-fifth aspect of embodiments of this application provides a communication apparatus. The communication apparatus includes an entity such as a network device, a terminal device, or a chip, and the communication apparatus includes a processor, configured to invoke a computer program in a memory, so that the processor performs any implementation of any one of the first aspect to the tenth aspect.

Optionally, the processor is coupled to the memory through an interface.

For technical effects brought by the twenty-fifth aspect, refer to the technical effects brought by different possible implementations of the first aspect to the tenth aspect.

A twenty-sixth aspect of embodiments of this application provides a communication system. The communication system includes the communication apparatus according to the eleventh aspect and the communication apparatus according to the twelfth aspect; or the communication system includes the communication apparatus according to the thirteenth aspect and the communication apparatus according to the fourteenth aspect; or the communication system includes the communication apparatus according to the seventeenth aspect and the communication apparatus according to the eighteenth aspect.

A twenty-seventh aspect of embodiments of this application provides a chip, including a processor, configured to: be connected to a memory, and invoke a program stored in the memory, to enable the processor to perform any implementation of the first aspect to the tenth aspect.

It can be learned from the foregoing technical solutions that embodiments of this application have the following advantages:

It can be learned from the foregoing technical solutions that the positioning device sends the request to the access network device. The request is used to request the information about the cell type of the access network device. The cell type includes an indoor cell or an outdoor cell; or the cell type includes any one of the following: a macro cell, a micro cell, or a lampsite cell. The positioning device receives the information about the cell type from the access network device. It can be learned from the foregoing solution that the positioning device obtains the information about the cell type from the access network device. In this way, the positioning device may select a more applicable positioning method for the terminal device based on the information about the cell type, so that positioning precision is improved, and positioning performance is improved.

DESCRIPTION OF EMBODIMENTS

The following clearly and completely describes technical solutions in embodiments of this application with reference to the accompanying drawings in embodiments of this application. It is clear that the described embodiments are merely some rather than all of embodiments of this application. All other embodiments obtained by a person skilled in the art based on embodiments of this application without creative efforts shall fall within the protection scope of this application.

The term "and/or" in this application may be an association relationship for describing associated objects and represents that at least three relationships may exist. For example, A and/or B may represent the following three cases: Only A exists, both A and B exist, and only B exists. In addition, the character "I" in this application usually indicates an "or" relationship between the associated objects.

In this application, terms such as "first" and "second" are used to distinguish same items or similar items that have basically same effects and functions. It should be understood that there is no logical or time sequence dependency between "first", "second", and "$n^{th}$", and a quantity and an execution sequence are not limited. It should be further understood that although terms such as "first" and "second" are used in the following descriptions to describe various elements, these elements should not be limited by the terms. These terms are merely used to distinguish one element from another element. The following describes some terms in this application.

A cell in which a terminal device is located includes a serving cell of the terminal device or a cell on which the terminal device camps.

The serving cell of the terminal device includes a cell that establishes a radio resource control (RRC) connection to the terminal device and that provides a service for the terminal device.

The cell on which the terminal device camps includes a cell selected by the terminal device in an idle state or an inactive state. The terminal device may receive system information of the cell, and monitor a control channel of the cell. When the terminal device needs to establish an RRC connection, the terminal device may access a network on the control channel of the cell.

Figure 1:
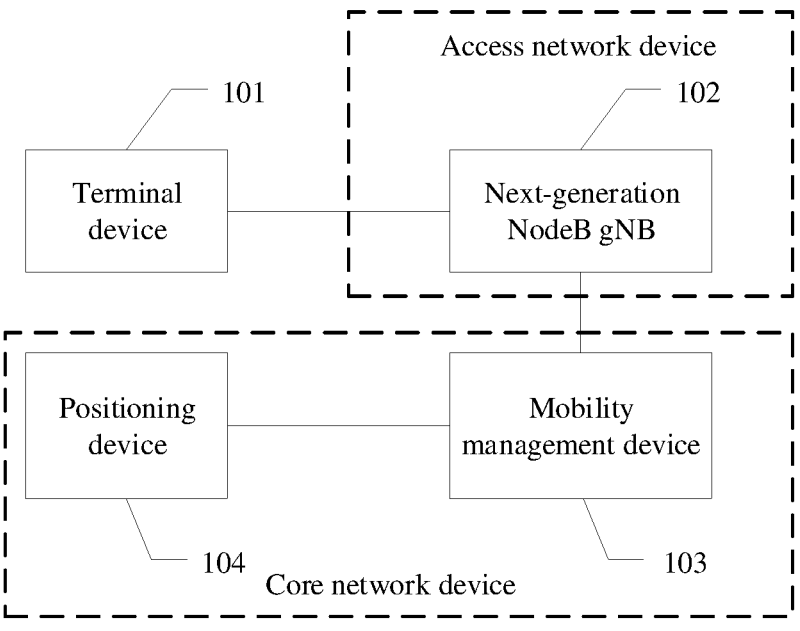
FIG. 1 is an example schematic diagram of a communication system according to an embodiment of this application.

FIG. 1 is a schematic diagram of a communication system according to an embodiment of this application. The communication system includes an access network device and a core network device. The access network device is deployed in a radio access network, and the access network device provides a wireless communication function for the terminal device. The core network device is responsible for access control, registration management, service management, mobility management, and the like of accessing a network by the terminal device.

The access network device may include a next-generation NodeB (gNB) 102. A terminal device 101 is connected to the gNB 102. FIG. 1 shows only an example in which the communication system includes the gNB 102. In an actual application, the communication system may further include more access network devices, or the communication system includes only one access network device. This is not specifically limited in this application. The access network device and the core network device may communicate with each other. The terminal device may communicate with the access network device. The access network device may further communicate with the core network device through the access network device.

The core network device may include a mobility management device 103 and a positioning device 104. The mobility management device 103 is configured to manage mobility of the terminal device 101. The positioning device is configured to perform positioning processing and management on a location of the terminal device 101.

The mobility management device may include an access and mobility management function (AMF) device. The positioning device 104 may include a location management function (LMF) device. The AMF device is responsible for access control, mobility management, and the like of accessing a network by the terminal device.

The access network device includes a macro site, a micro site, a small cell, a relay station, an access point (AP), a wearable device, a vehicle-mounted device, and the like. The access network device may further include a transmission reception point (TRP), a transmission measurement function (TMF), and the like. For example, the access network device in this embodiment of this application may be an access network device in new radio (NR). The access network device in 5G NR may also be referred to as a transmission reception point (TRP), a transmission point (TP), or the next-generation NodeB (gNB) shown in FIG. 1, or may be an evolved NodeB (eNB, or eNodeB) in a long term evolution (LTE) system shown in FIG. 1.

The terminal device, also referred to as user equipment (UE), a mobile station (MS), a mobile terminal (MT), or the like, is a device that includes a wireless connection function (providing voice/data connectivity to a user), for example, a handheld device with a wireless connection function or a vehicle-mounted device. Currently, some examples of the terminal device are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote surgery, a wireless terminal in smart grid, a wireless terminal in transportation safety, a wireless terminal in smart city, a wireless terminal in a smart home, and the like.

A name of the AMF device may change with evolution of the communication system. In a current communication system or a future communication system, any functional network element that has another name and that has a function similar to that of the AMF device may be understood as the AMF in this embodiment of this application and is applicable to a communication method provided in embodiments of this application. In this application, the AMF device is configured to forward information between the LMF device and the terminal device, or is configured to forward information between the LMF device and the access network device.

In this embodiment of this application, the LMF device is an example of the positioning device. The LMF device is a name in the current communication system. In the future communication system, a name of the LMF device may change with evolution of the communication system. The positioning device is configured to: select a positioning method for the terminal device, and perform positioning calculation on a location of the terminal device in the positioning method. Another device or functional network element that has a function similar to that of the positioning device may be understood as the positioning device in this embodiment of this application, and is applicable to a communication method in this application.

Currently, the positioning device receives a positioning request from the AMF device. The positioning request includes an identifier of the terminal device. The positioning device obtains capability information of the terminal device. Then, the positioning device selects a corresponding positioning method, for example, a positioning method based on a radio access technology or a GNSS positioning method, for the terminal device based on information included in the positioning request and the capability information of the terminal device. The positioning device positions the terminal device in the selected positioning method, to implement positioning of the terminal device.

The following describes the technical solutions of this application with reference to the information specific embodiments.

Figure 2:
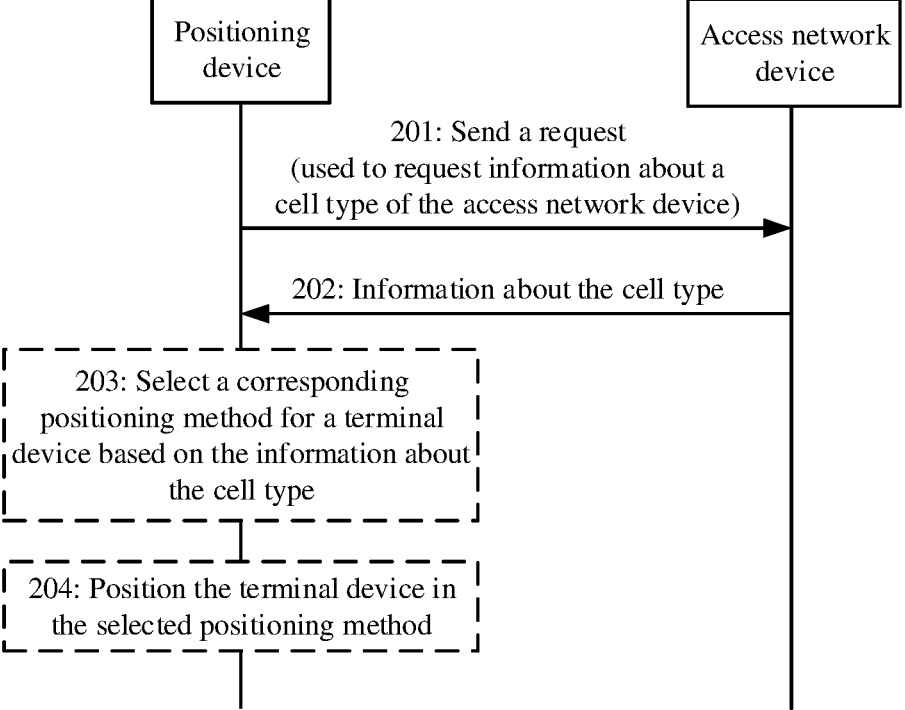
FIG. 2 is an example schematic diagram of an embodiment of a communication method according to an embodiment of this application.

FIG. 2 is a schematic diagram of an embodiment of a communication method according to an embodiment of this application. Refer to FIG. 2. The communication method includes the following steps.

201: A positioning device sends a request to an access network device, where the request is used to request information about a cell type of the access network device, and correspondingly, the access network device receives the request from the positioning device.

The following describes two possible implementations of the cell type of the access network device. This application is still applicable to another implementation. The following two possible implementations do not constitute a limitation on this application.

Implementation 1: The cell type of the access network device includes an indoor cell or an outdoor cell.

Specifically, a cell of the access network device may be located indoors, or may be located outdoors. The access network device may notify the positioning device of the cell type of the access network device by using the indoor cell or the outdoor cell.

Implementation 2: The cell type of the access network device includes any one of the following: a macro cell, a micro cell, or a lampsite cell.

A transmit power of a macro site is high, and a signal coverage area is large. The macro site is usually deployed outdoors. Therefore, the macro cell is usually an outdoor cell.

A small cell or a micro site has a lower transmit power and a smaller signal coverage area than the macro site. The small cell is usually deployed in a building or a dense area. A cell of the small cell or the micro site may be referred to as a micro cell. Therefore, the micro cell is usually an indoor cell.

A lamp site is usually deployed indoors, and is mainly used for indoor signal coverage. Therefore, the lampsite cell is usually an indoor cell.

It can be learned that the macro site is usually deployed outdoors, and the small cell, the micro site, and the lamp site are usually deployed indoors. The access network device may notify the positioning device of a type of each cell of the access network device in Implementation 2. For example, the access network device reports, to the positioning device, that a cell 1 is a macro cell. Because the macro site is usually deployed outdoors, the positioning device may determine that the cell 1 is an outdoor cell.

For another example, the access network device reports, to the positioning device, that a cell 2 is a lampsite cell. Because the lamp site is usually deployed indoors, the positioning device may determine that the cell 2 is an indoor cell.

Optionally, in Implementation 2, the request may be further used to request indoor or outdoor information of the cell of the access network device.

The indoor or outdoor information of the cell of the access network device includes: information indicating that the cell is located indoors, or information indicating that the cell is located outdoors.

For example, the cell of the access network device includes the cell 1 and the cell 2. The cell 1 is an outdoor cell, and the cell 2 is an indoor cell. Therefore, the indoor or outdoor information of the cell of the access network device includes: information indicating that the cell 1 is located indoors and information indicating that the cell 2 is located outdoors.

202: The access network device sends the information about the cell type to the positioning device, and correspondingly, the positioning device receives the information about the cell type from the access network device.

When the request is further used to request the indoor or outdoor information of the cell, in step 202, the access network device further sends the indoor or outdoor information of the cell to the positioning device, and correspondingly, the positioning device receives the indoor or outdoor information of the cell from the access network device.

In this case, the access network device may send the type of the cell and the indoor or outdoor information of the cell to the positioning device by using a TRP information response message or another message. This is not specifically limited in this application.

Optionally, the embodiment shown in FIG. 2 may further include step 203 and step 204.

203: The positioning device selects a corresponding positioning method for a terminal device based on the information about the cell type.

For example, a cell in which the terminal device is located is the cell of the access network device. The positioning device may determine, based on the information about the cell type of the access network device, a type of the cell in which the terminal device is located. Then, the positioning device selects a corresponding positioning method for the terminal device based on the type of the cell in which the terminal device is located.

In some implementations, the positioning method includes at least one of the following: a positioning method based on a radio access technology, a GNSS positioning method, or another positioning method.

Optionally, the positioning method based on the radio access technology includes at least one of the following: an uplink positioning method, a downlink positioning method, or a single-site positioning method.

The uplink positioning method includes an uplink time difference of arrival (UL-TDOA) positioning method and/or an uplink angle of arrival (UL-AOA) positioning method.

The UL-TDOA positioning method includes: The access network device measures an uplink signal sent by the terminal device, to obtain a plurality of uplink relative times of arrival (RTOA). The positioning device determines a location of the terminal device based on the plurality of RTOAs reported by the access network device.

The UL-AOA positioning method includes: The access network device measures the uplink signal from the terminal device, to obtain a plurality of AOAs. The positioning device determines a location of the terminal device based on the plurality of AOAs reported by the access network device.

The downlink positioning method includes a downlink time difference of arrival (DL-TDOA) positioning method and/or a downlink angle of departure (DL-AOD) positioning method.

The DL-TDOA positioning method includes: The terminal device measures downlink reference signals of a plurality of access network devices, to obtain a plurality of TDOAs. The terminal device determines a location of the terminal device based on the plurality of TDOAs. Alternatively, the positioning device determines a location of the terminal device based on the plurality of TDOAs reported by the terminal device.

The DL-AOD positioning method includes: The terminal device measures downlink reference signals of a plurality of access network devices, to obtain a plurality of reference signal received powers (RSRP). The terminal device determines a location of the terminal device based on the plurality of RSRPs and configuration information of the plurality of access network devices. Alternatively, the positioning device determines a location of the terminal device based on the plurality of RSRPs and configuration information of the plurality of access network devices.

The single-site positioning method includes a new radio enhanced cell identifier (NR E-CID) positioning method.

The NR E-CID positioning method includes: The access network device determines a location of the terminal device based on the information about the cell in which the terminal device is located and/or a measurement quantity of measuring a reference signal of the cell by the terminal device.

The GNSS positioning method includes: determining a location of the terminal device based on a measurement result obtained by measuring a GNSS signal by the terminal device.

For example, the cell in which the terminal device is located is the cell 1 of the access network device. The cell 1 is an outdoor cell. A distance between base stations is large, and the GNSS signal is strong. Positioning precision of the GNSS positioning method is better than positioning precision of the positioning method based on the radio access technology, and a GNSS positioning delay is shorter. The positioning device may select the GNSS positioning method for the terminal device.

For example, the cell in which the terminal device is located is the cell 2 of the access network device. The cell 2 is an indoor cell. Because an indoor GNSS signal is very weak, the GNSS positioning method is not applicable to a terminal device located indoors. Therefore, the positioning device may select the positioning method based on the radio access technology for the terminal device. The positioning method based on the radio access technology includes a plurality of positioning methods, and the positioning device may determine a specific positioning method based on the information capability information of the terminal device, and the like.

The positioning device receives the information about the cell type from the access network device. In this way, the positioning device may select a more applicable positioning method for the terminal device based on the information about the cell type, to ensure positioning precision of the terminal device. Further, the terminal device may move in a positioning process. For example, the terminal device moves from the indoor to the outdoor, or moves from the outdoor to the indoor, or moves from a place with a weak GNSS signal to a place with a strong GNSS signal. The positioning device may select a more applicable positioning method for the terminal device in a timely manner based on the information about the cell type, so that positioning precision is improved, and positioning performance is improved.

For example, if the terminal device moves from the indoor to the outdoor, the positioning device selects the positioning method based on the radio access technology for the terminal device before the terminal device moves. The positioning device may determine, based on the information about the cell type, that the cell in which the terminal device is located is an outdoor cell. Because an outdoor GNSS signal is strong, the positioning device may reselect the GNSS positioning method for the terminal device, to ensure high-precision positioning of the terminal device.

If the terminal device moves from the outdoor to the indoor, the positioning device selects the GNSS positioning method for the terminal device before the terminal device moves. The positioning device may determine, based on the information about the cell type, that the cell in which the terminal device is located is an indoor cell. Because the indoor GNSS signal is very weak, the positioning device may reselect the positioning method based on the radio access technology for the terminal device, to ensure high-precision positioning of the terminal device.

It can be learned that a positioning method applicable to the terminal device located indoors is different from a positioning method applicable to the terminal device located outdoors. Therefore, the positioning device may obtain the information about the cell type. In this way, the positioning device may select a more applicable positioning method for the terminal device based on the information about the cell type.

When the information about the cell type and the indoor or outdoor information of the cell are obtained, the positioning device may refer to the information, and select a corresponding positioning method for the terminal device.

204: The positioning device positions the terminal device in the selected positioning method.

For example, the positioning device selects the GNSS positioning method for the terminal device based on the information about the cell type. The positioning device may position the terminal device in the GNSS positioning method.

For example, the positioning device selects the positioning method based on the radio access technology for the terminal device based on the information about the cell type. The positioning device may position the terminal device in the positioning method based on the radio access technology.

In this embodiment of this application, the positioning device sends the request to the access network device. The request is used to request the information about the cell type of the access network device. Then, the positioning device receives the information about the cell type from the access network device. It can be learned from the foregoing solution that the positioning device obtains the information about the cell type from the access network device. In this way, the positioning device may select a more applicable positioning method for the terminal device based on the information about the cell type, to improve positioning precision, and improve positioning performance. For example, because the indoor GNSS signal is very weak, the GNSS positioning method is not applicable to the terminal device located indoors. Therefore, when the positioning device determines that the terminal device is located indoors, the positioning device may preferentially select the positioning method based on the radio access technology for the terminal device.

Figures 3, 4:
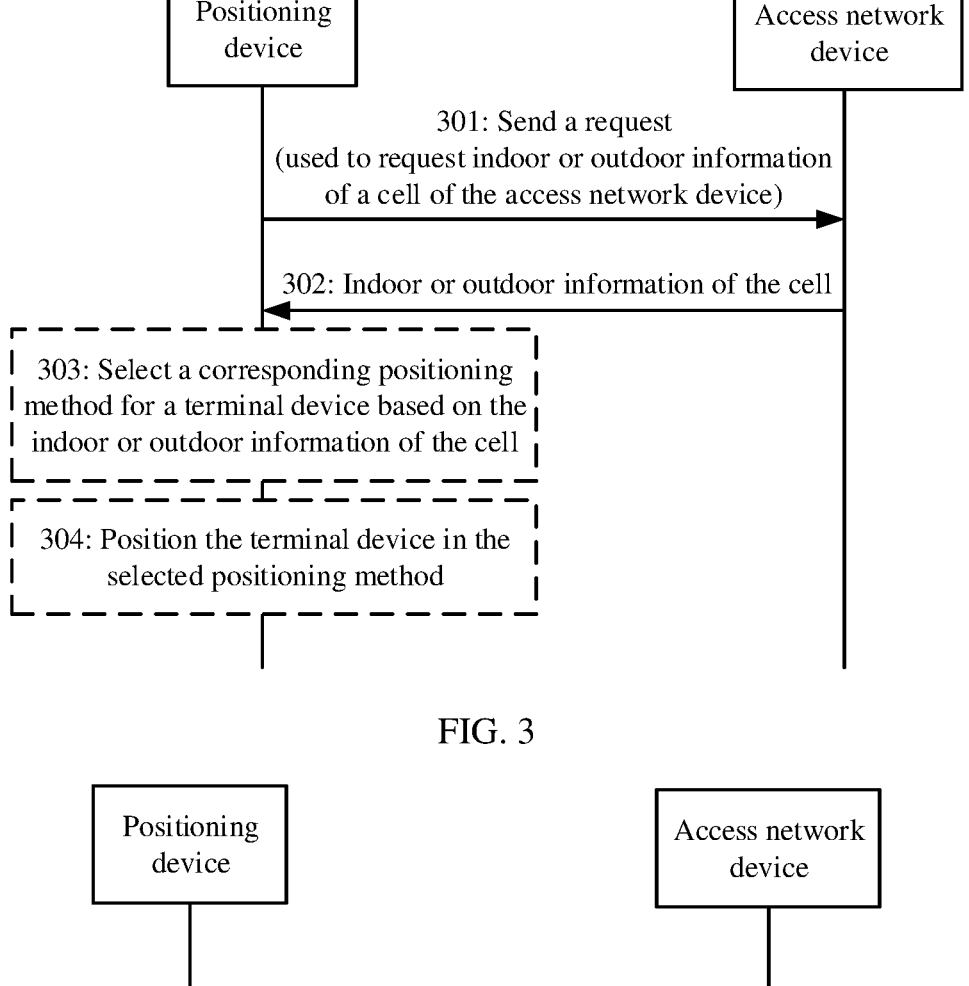
FIG. 3 is an example schematic diagram of another embodiment of a communication method according to an embodiment of this application.
FIG. 4 is an example schematic diagram of another embodiment of a communication method according to an embodiment of this application.

FIG. 3 is a schematic diagram of another embodiment of a communication method according to an embodiment of this application. Refer to FIG. 3. The communication method includes the following steps.

301: A positioning device sends a request to an access network device, where the request is used to request indoor or outdoor information of a cell of the access network device, and correspondingly, the access network device receives the request from the positioning device.

For related descriptions of the indoor or outdoor information of the cell of the access network device, refer to the related descriptions in the embodiment shown in FIG. 2. The indoor or outdoor information of the cell may be represented in a plurality of forms, provided that it can explicitly or implicitly indicate that the cell of the access network device is an indoor cell or the cell of the access network device is an outdoor cell.

Optionally, the request is further used to request information about a cell type of the access network device. For related descriptions of the information about the cell type, refer to the related descriptions in the embodiment shown in FIG. 2.

302: The access network device sends the indoor or outdoor information of the cell to the positioning device, and correspondingly, the positioning device receives the indoor or outdoor information of the cell from the access network device.

It should be noted that step 301 and step 302 may be used as a complete technical solution.

Optionally, the embodiment shown in FIG. 3 further includes step 303 and step 304.

303: The positioning device selects a corresponding positioning method for the terminal device based on the indoor or outdoor information of the cell.

For example, the positioning device determines, based on the indoor or outdoor information of the cell, indoor or outdoor information of a cell in which the terminal device is located. Then, the positioning device selects a corresponding positioning method for the terminal device based on the indoor or outdoor information of the cell in which the terminal device is located.

For related descriptions of the positioning method, refer to the related descriptions in step 204 in the embodiment shown in FIG. 2.

304: The positioning device positions the terminal device in the selected positioning method.

Step 304 is similar to step 204 in the embodiment shown in FIG. 2. For details, refer to the related descriptions of step 204 in the embodiment shown in FIG. 2.

In this embodiment of this application, the positioning device sends the request to the access network device. The request is used to request the indoor or outdoor information of the cell of the access network device. Then, the positioning device receives the indoor or outdoor information of the cell from the access network device. It can be learned from the foregoing solution that the positioning device obtains the indoor or outdoor information of the cell from the access network device. In this way, the positioning device may select a more applicable positioning method for the terminal device based on the indoor or outdoor information of the cell, to improve positioning precision, and improve positioning performance. For example, because the indoor GNSS signal is very weak, a GNSS positioning method is not applicable to a terminal device located indoors. Therefore, when the positioning device determines that the terminal device is located indoors, the positioning device may preferentially select the positioning method based on the radio access technology for the terminal device.

In step 201 or 301, the request may be sent to the access network device by using a TRP information request message or another message. The another message may alternatively be a newly defined message. For details, refer to step 401 in the embodiment shown in FIG. 4.

Step 202 or 302 may be implemented by using a TRP information response message or another message. The another message may be a newly defined message. Details are described in step 402 in the embodiment shown in FIG. 4.

FIG. 4 is a schematic diagram of another embodiment of a communication method according to an embodiment of this application. Refer to FIG. 4. The communication method includes the following steps.

401: A positioning device sends a TRP information request message to an access network device, the positioning device sends the request in step 201 or step 301 to the access network device by using the TRP information request message, and correspondingly, the access network device receives the TRP information request message, where the TRP information request message is used to request TRP information from the access network device, and the TRP information includes a TRP identifier (TRP ID), a cell ID, and the like.

In a possible implementation, in step 401, the positioning device sends the request to the access network device by using the TRP information request message, to request information about a cell type of the access network device. Optionally, the TRP information request message is further used to request indoor or outdoor information of a cell.

It can be learned that, in a process in which the positioning device requests the TRP information by using the TRP information request message, a type of a cell of the access network device is requested. There is no need to define a new request message, and message resources are saved. In addition, in a process of requesting the TRP information, the type of the cell of the access network device is also requested. The TRP information may include information about the cell, to help the access network device parse the request. There is no need to indicate, by using other indication signaling or another indication field, a specific cell or specific cells whose type is specifically requested by the positioning device. Therefore, signaling overheads or bit overheads are reduced.

In a possible implementation, the TRP information request message includes a TRP information type item.

That the request is used to request the information about the cell type includes: requesting the information about the cell type by using the TRP information type item. The following shows the TRP information type item based on the information Table 1.

TABLE 1

| >> TRP information type item | Enumerated ENUMERATED {new radio physical cell identifier (new radio physical cell identifier, NR PCI), new radio cell global identifier (new radio cell global identifier, NR CGI), new radio absolute radio frequency channel number (new radio absolute radio frequency channel number, NR ARFCN), cell type (cell type)} |
|---|---|

It can be learned from Table 1 that the TRP information type item is used to list the TRP information requested by the positioning device. In this application, the cell type (cell type) is added to the TRP information type item, to request the information about the cell type from the access network device.

It can be learned that the TRP information type item is used to list the TRP information requested by the positioning device. Therefore, the positioning device may request the information about the cell type from the access network device by using the TRP information type item. There is no need to redefine a new information element, so that an information element of the TRP information request message is simple. The positioning device requests the information about the cell type by using the TRP information type item. That is, a specific request manner is provided.

In addition, the TRP information type item lists information that is about a TRP and that is requested by the positioning device, and the TRP information includes information about the cell. Therefore, the positioning device requests the information about the cell type by using the TRP information type item. The access network device may understand that the TRP information requested by the positioning device includes the type of the cell. There is no need to indicate, by using another indication field or indication instruction, a specific cell or specific cells whose type is specifically requested by the positioning device. Therefore, signaling overheads or bit overheads are reduced.

In another possible implementation, in step 401, the positioning device sends the request to the access network device by using the TRP information request message, to request the indoor or outdoor information of the cell of the access network device. Optionally, the request is further used to request the information about the cell type.

Beneficial effects brought when the positioning device requests the indoor or outdoor information of the cell by using the TRP information type item is similar to beneficial effects brought when the positioning device requests the information about the cell type by using the TRP information type item. For details, refer to the foregoing related descriptions.

402: The access network device sends a TRP information response message to the positioning device, and correspondingly, the positioning device receives the TRP information response message from the access network device.

In a possible implementation, in step 402, the TRP information response message further includes the information about the cell type. Optionally, the TRP information response message further includes the indoor or outdoor information of the cell.

Optionally, the TRP information response message includes the TRP information, and the information about the cell type is carried in the TRP information. Optionally, the indoor or outdoor information of the cell is carried in the TRP information.

In a possible implementation, the TRP information includes a TRP information type. The information about the cell type is located in the TRP information type.

For example, Table 2 shows the TRP information included in the TRP information response message. The cell type is added to the TRP information type. The cell type is an indoor cell or an outdoor cell.

TABLE 2

| Information element (information element, IE)/Group name (Group Name) | Information element type and reference (IE Type and Reference) |
| --- | --- |
| TRP identifier (TRP ID) | |
| TRP information type (TRP Information | |

TABLE 2-continued

| Type) | |
| --- | --- |
| > Choice TRP information item (CHOICE TRP Information Item) | |
| >> New radio physical cell identifier (NR PCI) | |
| >> New radio cell global identifier (NR CGI) | |
| >> Cell type (Cell Type) | Enumerated (indoor, outdoor, . . . ) ENUMERATED (indoor, outdoor, . . . ) |

It can be learned from Table 2 that the cell type (Cell Type) includes a type of a cell corresponding to the NR PCI or the NR CGI in Table 2. For example, the NR PCI or the NR CGI is an identifier of a cell 1 of the access network device. If the type of the cell 1 is an indoor cell, a value of the cell type in Table 2 is "indoor"; or if the type of the cell 1 is an outdoor cell, a value of the cell type in Table 2 is "outdoor".

It can be learned that the TRP information type in the TRP information is used to list TRP information provided by the access network device for the positioning device. The access network device may provide the information about the cell type for the positioning device by using the TRP information type. There is no need to redefine a new information element, so that an information element of the TRP information response message is simple. The positioning device uses the TRP information type of the TRP information response message to carry the information about the cell type. That is, a specific carrying manner is provided.

The TRP information type lists the TRP information provided by the access network device for the positioning device. The TRP information includes the information about the cell of the access network device. Therefore, the information about the cell type is placed in the TRP information type. The positioning device may understand that the information about the cell type is information that is about the cell type and that is included in the TRP information. In this way, there is no need to indicate, by using another indication field or indication instruction, a specific cell or specific cells whose type is provided by the access network device. Therefore, signaling overheads or bit overheads are reduced.

In another possible implementation, in step 402, the TRP information response message further carries the indoor or outdoor information of the cell. Optionally, the TRP information response message further carries the information about the cell type.

Optionally, the TRP information response message includes the TRP information, and the indoor or outdoor information of the cell is carried in the TRP information.

Optionally, the information about the cell type is carried in the TRP information.

In a possible implementation, the TRP information includes the TRP information type. The indoor or outdoor information of the cell is carried in the TRP information type.

Beneficial effects brought when a communication device uses the TRP information to carry the indoor or outdoor information of the cell is similar to beneficial effects brought when the communication device uses the TRP information to carry the information about the cell type. For details, refer to the foregoing related descriptions.

In step 401 and step 402, the positioning device requests and obtains the information about the cell type and/or the indoor or outdoor information of the cell from the access network device by using a message of a TRP information obtaining procedure. In this way, there is no need to define a new message, to improve practicability of this solution. In a process in which the positioning device requests the TRP information from the access network device, the positioning device requests the information about the cell type and/or the indoor or outdoor information of the cell from the access network device, to save message resources.

Figure 5:
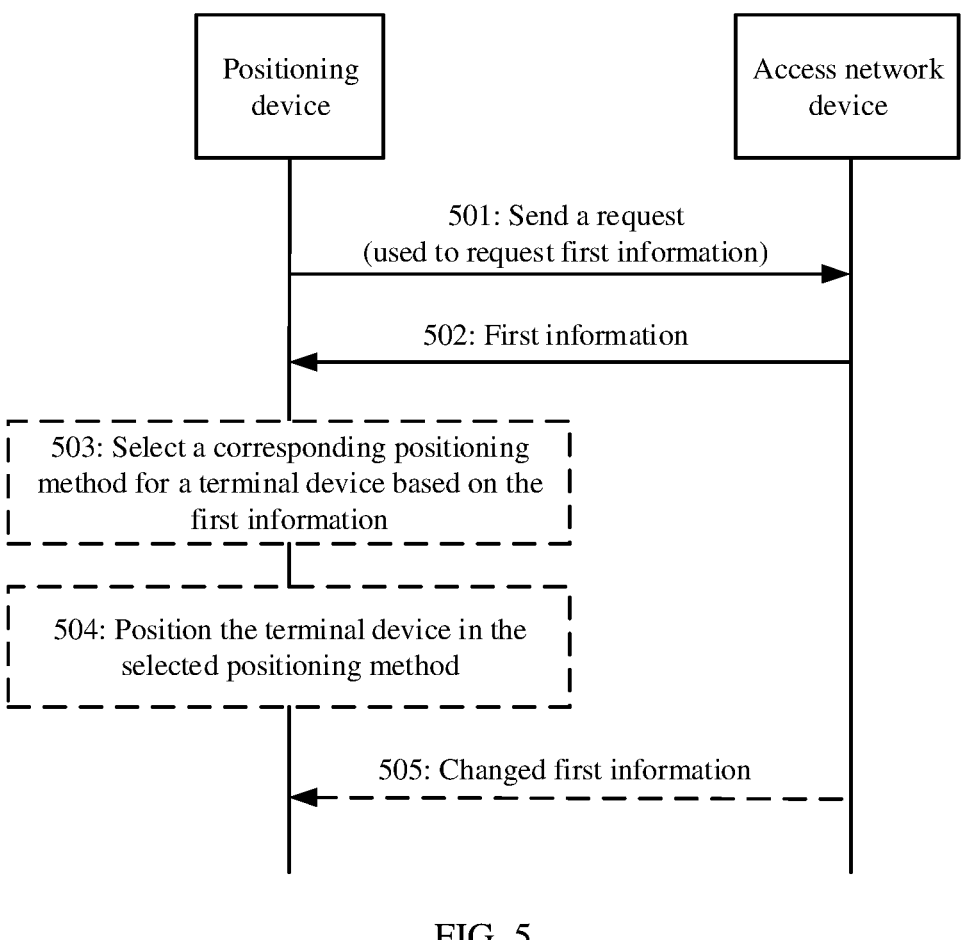
FIG. 5 is an example schematic diagram of another embodiment of a communication method according to an embodiment of this application.

FIG. 5 is a schematic diagram of another embodiment of a communication method according to an embodiment of this application. Refer to FIG. 5. The communication method includes the following steps.

501: A positioning device sends a request to an access network device, where the request is used to request first information, and the first information includes indoor or outdoor information of a terminal device, and correspondingly, the access network device receives the request from the positioning device.

The indoor or outdoor information of the terminal device includes: information indicating that the terminal device is located indoors, or information indicating that the terminal device is located outdoors.

In a first optional implementation, the first information further includes indoor or outdoor information of a cell in which the terminal device is located. The indoor or outdoor information of the cell in which the terminal device is located includes: information indicating that the cell in which the terminal device is located is located indoors, or information indicating that the cell in which the terminal device is located is located outdoors.

In a second optional implementation, the first information further includes information about a type of the cell in which the terminal device is located.

The following describes two possible implementations of the type of the cell in which the terminal device is located. This application is still applicable to another implementation. The following two possible implementations do not constitute a limitation on this application.

Implementation 1: The type of the cell in which the terminal device is located includes an indoor cell or an outdoor cell.

Implementation 2: The type of the cell in which the terminal device is located includes any one of the following: a macro cell, a micro cell, or a lampsite cell.

For related descriptions of the macro cell, the micro cell, or the lampsite cell, refer to the related descriptions in the embodiment shown in FIG. 2.

It should be noted that, in Implementation 2, the first information may further include the indoor or outdoor information of the cell in which the terminal device is located.

The positioning device directly requests the first information from the access network device by using the request. The access network device may directly send the first information to the positioning device.

For example, after receiving the request from the positioning device, the access network device may send, to the positioning device, the first information locally stored in the access network device. Alternatively, the access network device may request the first information from the terminal device, and then send the first information to the positioning device. Alternatively, the access network device independently determines the first information of the terminal device, and then sends the first information to the positioning device. For example, the access network device is a small cell, and the small cell is usually deployed indoors. The terminal device accesses the access network device.

Therefore, the access network device may determine that the terminal device is located indoors.

Optionally, the request is used to request the access network device to send the first information to the positioning device when indoor or outdoor information of the terminal device changes.

In this possible implementation, the positioning device requests the access network device to send the first information to the positioning device when the indoor or outdoor information of the terminal device changes. This helps the positioning device select an applicable positioning method for the terminal device in a timely manner based on the first information, to ensure high-precision positioning.

502: The access network device sends the first information to the positioning device.

Optionally, the request is used to request the access network device to send the first information to the positioning device when the indoor or outdoor information of the terminal device changes. In step 502, when the indoor or outdoor information of the terminal device changes, the access network device feeds back the first information to the positioning device. The first information includes at least one of the following: changed indoor or outdoor information of the terminal device, changed information about the type of the cell in which the terminal device is located, or changed indoor or outdoor information of the cell in which the terminal device is located.

It should be noted that, in some special cases, the first information includes the indoor or outdoor information of the cell in which the terminal device is located, but does not include the indoor or outdoor information of the terminal device. Alternatively, the first information includes the information about the type of the cell in which the terminal device is located, but does not include the indoor or outdoor information of the terminal device, provided that the positioning device can determine, based on the first information, a location of the terminal device located indoors or outdoors, to further reduce bit overheads of information transmission.

Optionally, the embodiment shown in FIG. 5 may further include step 503 and step 504.

503: The positioning device selects a corresponding positioning method for the terminal device based on the first information.

For related descriptions of the positioning method, refer to the related descriptions in step 203 in the embodiment shown in FIG. 2.

For example, the first information includes information indicating that the terminal device is located indoors. Because an indoor GNSS signal is very weak, the GNSS positioning method is not applicable to a terminal device located indoors. The positioning device may select the positioning method based on the radio access technology for the terminal device. The positioning method based on the radio access technology includes a plurality of positioning methods, and the positioning device may determine a specific positioning method based on capability information of the terminal device, and the like.

For another example, the first information includes the information about the type of the cell in which the terminal device is located. The type of the cell in which the terminal device is located is a macro cell. A macro site is usually deployed outdoors, and the macro cell is an outdoor cell. However, a distance between base stations is large, and the GNSS signal is strong. Positioning precision of the GNSS positioning method is better than positioning precision of the positioning method based on the radio access technology, and a GNSS positioning delay is shorter. The positioning device may select the GNSS positioning method for the terminal device.

504: The positioning device positions the terminal device in the selected positioning method.

Step 504 is similar to step 204 in the embodiment shown in FIG. 2. For details, refer to the related descriptions of step 204 in the embodiment shown in FIG. 2.

Optionally, the embodiment shown in FIG. 5 further includes step 505. Step 505 may be performed after step 504.

505: The access network device sends changed first information to the positioning device, and correspondingly, the positioning device receives the changed first information from the access network device.

The changed first information includes at least one of the following: changed indoor or outdoor information of the terminal device, changed information about the type of the cell in which the terminal device is located, or changed indoor or outdoor information of the cell in which the terminal device is located.

Specifically, when the indoor or outdoor information of the terminal device changes, the access network device sends the changed first information to the positioning device.

When the request is used to request the access network device to send the first information to the positioning device when the indoor or outdoor information of the terminal device changes, after the access network device receives the request in step 501, the access network device may feed back the changed first information to the positioning device in step 502. In step 505, the access network device may feed back, to the positioning device, the first information that changes again after the access network device receives the request in step 501.

It should be noted that, when the request is used to request the access network device to send the first information to the positioning device when the indoor or outdoor information of the terminal device changes, after the access network device receives the request in step 501, the access network device may feed back, to the positioning device in step 502, the first information existing before a change. In step 505, the access network device may feed back the changed first information to the positioning device.

In some implementations, in step 505, the positioning device may send the changed first information to the access network device by using a positioning information update message or another message. This is not specifically limited in this application.

In this embodiment of this application, the positioning device sends the request to the access network device. The request is used to request first information. The first information includes the indoor or outdoor information of the terminal device. The access network device sends the first information to the positioning device. It can be learned that the positioning device obtains the first information from the access network device. In this way, the positioning device may select a more applicable positioning method for the terminal device based on the first information, to improve positioning precision, and improve positioning performance.

In step 501 in the embodiment shown in FIG. 5, the request may be sent to the access network device by using a positioning information request message or another message. The another message may alternatively be a newly defined message. Details may be described with reference to step 601 in the embodiment shown in FIG. 6.

Step 502 in the embodiment shown in FIG. 5 may be implemented by using a positioning information response message or another message. The another message may be a newly defined message. Details are described in step 602 in the embodiment shown in FIG. 6.

Step 505 in the embodiment shown in FIG. 5 may be implemented by using a positioning information update message or another message. The another message may be a newly defined message. Details are described in step 605 in the embodiment shown in FIG. 6.

Figure 6:
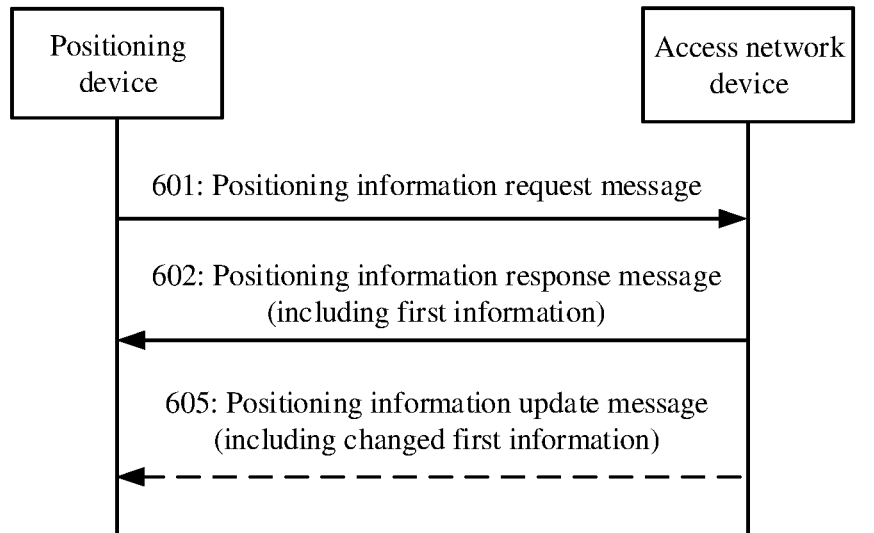
FIG. 6 is an example schematic diagram of another embodiment of a communication method according to an embodiment of this application.

FIG. 6 is a schematic diagram of another embodiment of a communication method according to an embodiment of this application. Refer to FIG. 6. The communication method includes the following steps.

601: A positioning device sends a positioning information request message to an access network device, the positioning device sends a request to the access network device by using the positioning information request message, and correspondingly, the access network device receives the positioning information request message from the positioning device.

In step 601, the positioning device sends the request to the access network device by using the positioning information request message. There is no need to define a new request message, message resources are reduced, and practicability of this solution is improved.

Optionally, the positioning information request message includes a newly added information element. That the request is used to request the first information includes: requesting the first information by using the newly added information element. For example, the newly added information element is indoor/outdoor information. The positioning device requests the first information from the access network device by using an information element of the indoor/outdoor information.

It should be noted that the positioning device may implicitly or explicitly request the first information from the access network device.

For example, the positioning information request message in step 601 includes the newly added information element. The positioning device explicitly requests the first information by using the newly added information element.

For example, the positioning device sends the positioning information request message to the access network device. After the access network device receives the positioning information request message, the access network device feeds back the first information to the positioning device. In other words, the positioning information request message is a specific form in which the positioning device requests the first information. The positioning device may implicitly request the first information by using the positioning information request message.

602: The access network device sends a positioning information response message to the positioning device, where the positioning information response message includes the first information, and correspondingly, the positioning device receives the positioning information response message from the access network device.

Optionally, the positioning information response message includes a newly added information element. The first information is carried in the newly added information element.

For example, the newly added information element in the positioning information response message is indoor/outdoor information.

It should be noted that, if the indoor or outdoor information of the terminal device does not change, the positioning information response message in step 602 may not include the first information, or the positioning information response message in step 602 includes the first information existing before a change.

It can be learned that, in step 601 and step 602, the positioning device requests the first information from the access network device by using a positioning procedure. In this way, there is no need to redefine a message, to improve practicability of this solution.

605: The access network device sends a positioning information update message to the positioning device, where the positioning information update message includes the changed first information, and correspondingly, the positioning device receives the positioning information update message from the access network device.

Step 605 may be performed after step 602.

Optionally, the positioning information update message includes a newly added information element. The changed first information is carried in the newly added information element.

In step 601 and step 602, the positioning device obtains the first information by using a message in the positioning procedure. In this way, there is no need to define a new message, and the first information can be obtained by using a simplified signaling procedure.

Figures 7, 8:
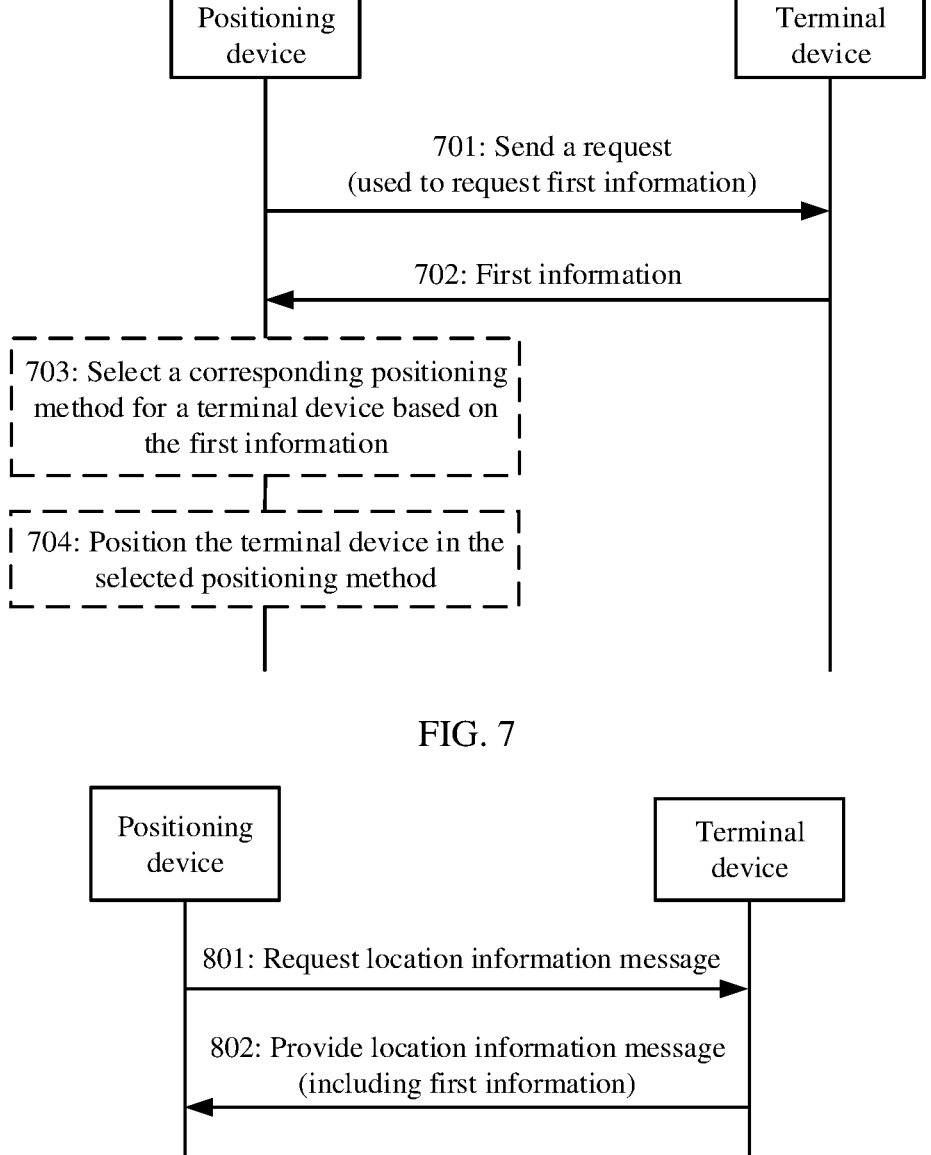
FIG. 7 is an example schematic diagram of another embodiment of a communication method according to an embodiment of this application.
FIG. 8 is an example schematic diagram of another embodiment of a communication method according to an embodiment of this application.

FIG. 7 is a schematic diagram of another embodiment of a communication method according to an embodiment of this application. Refer to FIG. 7. The communication method includes the following steps.

701: A positioning device sends a request to a terminal device, where the request is used to request first information, and the first information includes indoor or outdoor information of the terminal device, and correspondingly, the terminal device receives the request from the positioning device.

The positioning device may send the request to the terminal device by using the access network device, and correspondingly, the terminal device receives the request of the positioning device by using the access network device.

In a first optional implementation, the first information further includes information about a type of a cell in which the terminal device is located.

In a second optional implementation, the first information further includes indoor or outdoor information of a cell in which the terminal device is located.

For related descriptions of the indoor or outdoor information of the terminal device, the information about the type of the cell in which the terminal device is located, and the indoor or outdoor information of the cell in which the terminal device is located, refer to the related descriptions in step 501 in the embodiment shown in FIG. 5.

Optionally, the request is used to request the terminal device to send the first information to the positioning device when the indoor or outdoor information changes.

In this implementation, after the terminal device receives the request from the positioning device, when the indoor or outdoor information of the terminal device changes, the terminal device sends the first information to the positioning device. The positioning device may select an applicable positioning method for the terminal device in a timely manner based on the first information, to ensure high-precision positioning.

702: The terminal device sends the first information to the positioning device, and correspondingly, the network device receives the first information from the terminal device.

For example, the request is used to request the first information. The terminal device may directly send the first information to the positioning device.

Optionally, when the request is used to request the terminal device to send the first information to the positioning device when the indoor or outdoor information changes, when the indoor or outdoor information of the terminal device changes, the terminal device sends the first information to the positioning device. In other words, after the terminal device receives the request from the positioning device, when the indoor or outdoor information of the terminal device changes, the terminal device feeds back the first information to the positioning device.

It should be noted that, in some special cases, the first information includes the indoor or outdoor information of the cell in which the terminal device is located, but does not include the indoor or outdoor information of the terminal device. Alternatively, the first information includes the information about the type of the cell in which the terminal device is located, but does not include the indoor or outdoor information of the terminal device, provided that the positioning device can determine, based on the first information, a location of the terminal device located indoors or outdoors, to further reduce bit overheads of information transmission.

Optionally, the embodiment shown in FIG. 7 further includes step 703 and step 704. Step 703 and step 704 may be performed after step 702.

703: The positioning device selects a corresponding positioning method for the terminal device based on the first information.

704: The positioning device positions the terminal device in the selected positioning method.

Step 703 and step 704 are similar to step 503 and step 504 in the embodiment shown in FIG. 5. For details, refer to related descriptions of step 503 and step 504 in the embodiment shown in FIG. 5.

In this embodiment of this application, the positioning device sends the request to the terminal device. The request is used to request the first information. The first information includes the indoor or outdoor information of the terminal device. Then, the terminal device sends the first information to the positioning device. After the positioning device obtains the first information, the positioning device may select a more applicable positioning method for a terminal based on the first information, to improve positioning precision, and improve positioning performance.

In step 701 in the embodiment shown in FIG. 7, the request may be sent to the terminal device by using a request location information message or another message. The another message may be a newly defined message or another existing message. For details, refer to related descriptions of step 801 in the embodiment shown in FIG. 8.

Step 702 in the embodiment shown in FIG. 7 may be implemented by using a provide location information message or another message. The another message may be a newly defined message or another existing message. For details, refer to related descriptions of step 802 in the embodiment shown in FIG. 8.

FIG. 8 is a schematic diagram of another embodiment of a communication method according to an embodiment of this application. Refer to FIG. 8. The communication method includes the following steps.

801: A positioning device sends a request location information message to a terminal device, the positioning device sends a request to the terminal device by using the request location information message, and correspondingly, the terminal device receives the request location information message from the positioning device.

In step 801, the positioning device sends the request to the terminal device by using the request location information message. There is no need to define a new message, to improve practicability of this solution, and facilitate an implementation of this solution.

Optionally, the request location information message includes a common information element request location information. That the request is used to request the first information includes: requesting the first information by using the common information element request location information.

Specifically, the positioning device requests the first information from the terminal device by using the common information element request location information. In this way, there is no need to define a new information element, so that an information element included in the request location information message is simple. The common information element request location information is usually used to list positioning information requested by the positioning device from the terminal device. The positioning device may list, by using the common information element request location information, the first information requested by the positioning device from the terminal device. This helps the terminal device parse the request.

It should be noted that the positioning device may implicitly or explicitly request the first information.

For example, in step 801, the positioning device requests the first information by using the common information element request location information in the request location information message.

For example, the positioning device sends the request location information message to the terminal device. After the terminal device receives the request location information message, the terminal device may feed back the first information to the positioning device. In other words, the request location information message is a specific form in which the positioning device request the first information. The positioning device implicitly requests the first information from the terminal device by using the request location information message.

Optionally, when the request is used to request the terminal device to send the first information to the positioning device when the indoor or outdoor information changes, the request location information message includes the common information element request location information. That the request is used to request the first information includes: requesting the first information by using the common information element request location information.

Specifically, the positioning device requests the first information from the terminal device by using the common information element request location information. For example, a reporting condition of the indoor or outdoor information of the terminal device is added to the common information element request location information.

For example, the reporting condition may be that the indoor or outdoor information of the terminal device changes. In a moving process of the terminal device, the terminal device may move from the indoor to the outdoor, or move from the outdoor to the indoor. In this case, the indoor or outdoor information of the terminal device changes.

The following describes two possible implementations in which the terminal device determines that the indoor or outdoor information of the terminal device changes. It should be noted that the following two implementations are merely examples. The terminal device may alternatively determine, in another manner, whether the indoor or outdoor information of the terminal device changes. This is not specifically limited in this application.

Manner 1: The terminal device determines, based on a type of a cell to which the terminal device moves, whether the indoor or outdoor information of the terminal device changes.

For example, before the terminal device moves, the cell in which the terminal device is located is an indoor cell. If the cell to which the terminal device moves is an outdoor cell, the terminal device may determine that the indoor or outdoor information of the terminal device changes.

It should be noted that, in Manner 1, the terminal device may store at least one of the following: a type of a cell of an access network device, a type of a cell of the access network device, or indoor or outdoor information of a cell in which the access network device is located. The terminal device may determine, based on the information, whether the indoor or outdoor information of the terminal device changes.

Alternatively, the terminal device receives a system broadcast message of a cell of the access network device; and the terminal device determines, based on the system broadcast message, at least one of the following: a type of a cell of an access network device, a type of a cell of the access network device, or indoor or outdoor information of a cell in which the access network device is located. The terminal device may determine, based on the information, whether the indoor or outdoor information of the terminal device changes.

Manner 2: The terminal device determines, based on signal strength of a GNSS signal, whether the indoor or outdoor information of the terminal device changes.

For example, before the terminal device moves, the terminal device is located outdoors. In a moving process of the terminal device, the terminal device may detect the signal strength of the GNSS signal. Because an indoor GNSS signal is weak, if the terminal device detects that the signal strength of the GNSS signal is less than a first preset threshold, the terminal device may determine that the terminal device is located indoors, and determine that the indoor or outdoor information of the terminal device changes. If the terminal device detects that the signal strength of the GNSS signal is greater than the second preset threshold, the terminal device may determine that the terminal device is located outdoors, and determine that the indoor or outdoor information of the terminal device does not change.

In a possible implementation, the common information element request location information includes a triggering reporting condition. The positioning device requests the first information by using the triggering reporting condition.

The positioning device requests the first information by using the triggering reporting condition. The triggering reporting condition is that a sub-information element in the common information element request location information. A specific implementation in which the positioning device requests the first information is provided. In this way, there is no need to define a new information element, so that an information element structure of the request location information message is simple. Further, the triggering reporting condition usually indicates some network behaviors of the terminal device when the reporting condition is met. Therefore, the positioning device requests the first information from the terminal device by using the triggering reporting condition, so that the terminal device can understand the triggering reporting condition. In this way, when the triggering reporting condition is met, the terminal device reports the first information to the positioning device. In this way, the reporting condition does not need to be additionally indicated by using another indication field or other indication signaling. Therefore, signaling overheads or bit overheads are reduced.

802: The terminal device sends a provide location information message to the positioning device, where the provide location information message includes the first information. The positioning device receives the provide location information message from the terminal device.

In step 802, the terminal device provides the first information for the positioning device by using a message of a positioning procedure. In this way, there is no need to define a new message, to improve practicability of this solution.

Optionally, the terminal device may use an information element of the provide location information message to carry the first information. The following describes two possible implementations. This application is still applicable to another implementation. This is not specifically limited in this application.

Implementation 1: The provide location information message includes a common information element provide location information. The first information is carried in the common information element provide location information.

The common information element provide location information is used to list location information provided by the terminal device for the positioning device. Therefore, the terminal device may send the first information to the positioning device by using the common information element provide location information. In this way, there is no need to redefine a new information element, so that an information element structure of the provide location information message is simple. The common information element provide location information lists the location information provided by the terminal device for the positioning device. Therefore, the terminal device may send the first information to the positioning device by using the common information element provide location information, to help the positioning device parse the first information.

Implementation 2: The provide location information message includes new radio enhanced cell identifier provide location information. The first information is carried in the new radio enhanced cell identifier provide location information.

In Implementation 2, the new radio enhanced cell identifier provide location information is used to list location information provided by the terminal device for the positioning device. Therefore, the terminal device may send the first information to the positioning device by using the new radio enhanced cell identifier provide location information. In this way, there is no need to redefine a new information element, so that an information element structure of the provide location information message is simple. The terminal device provides the first information for the positioning device by using the new radio enhanced cell identifier provide location information, to help the positioning device parse and read the first information.

In step 801 and step 802, the positioning device obtains the first information by using a message in the positioning procedure. In this way, there is no need to define a new message, and the first information can be obtained by using a simplified signaling procedure.

Figures 9, 10:
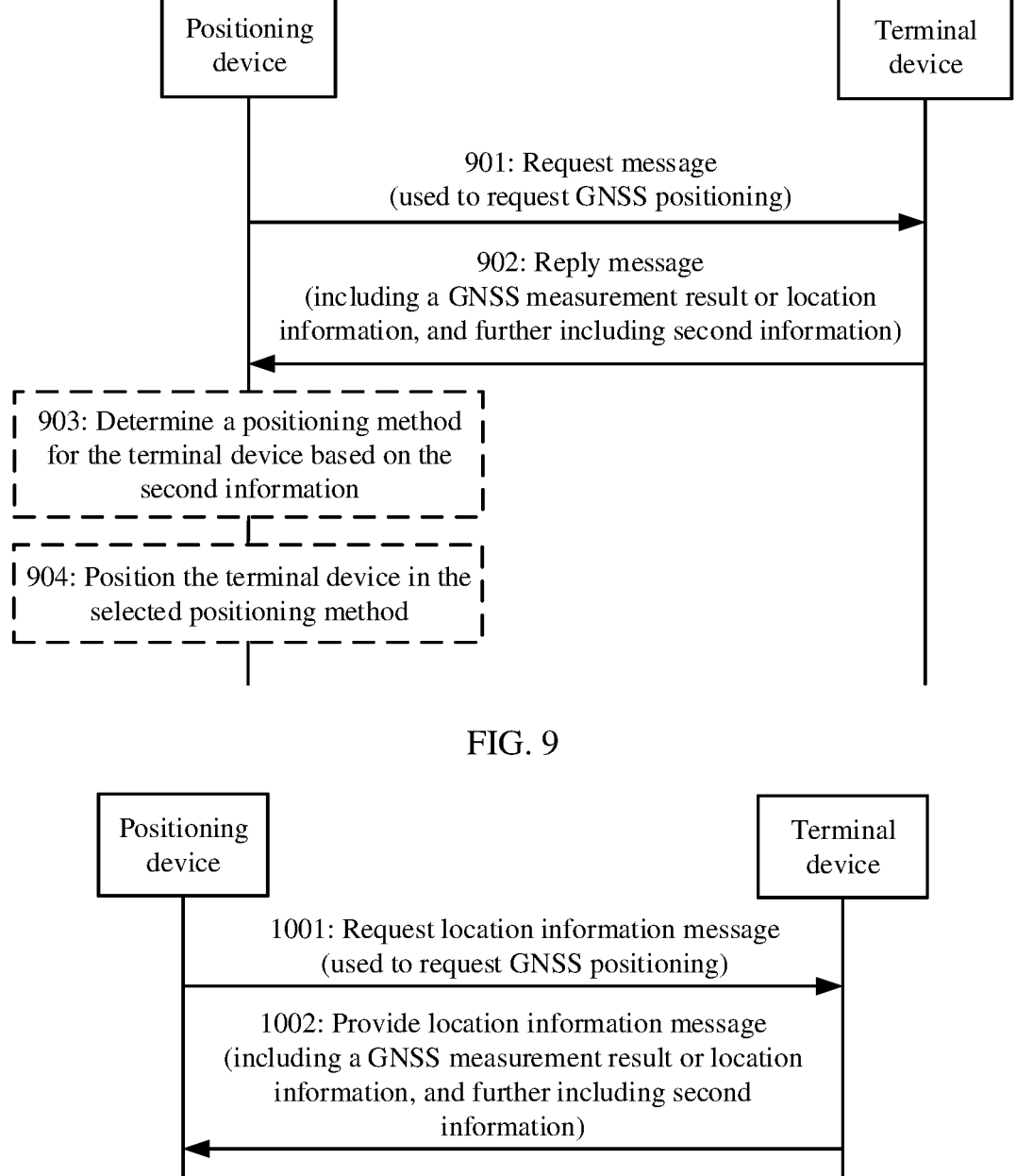
FIG. 9 is an example schematic diagram of another embodiment of a communication method according to an embodiment of this application.
FIG. 10 is an example schematic diagram of another embodiment of a communication method according to an embodiment of this application.

FIG. 9 is a schematic diagram of another embodiment of a communication method according to an embodiment of this application. Refer to FIG. 9. The communication method includes the following steps.

901: A positioning device sends a request message to a terminal device, and correspondingly, the terminal device receives the request message from the positioning device.

The request message is used to request GNSS positioning.

In a GNSS positioning process, the positioning device sends the request message to the terminal device by using an access network device, and correspondingly, the terminal device receives the request message of the positioning device by using the access network device.

Optionally, the request message includes third information. The third information is used to request second information. The second information indicates that the terminal device is/is not applicable to GNSS measurement.

Optionally, the second information includes at least one of the following: indoor or outdoor information of the terminal device, quality information of a GNSS measurement quantity, availability of the GNSS measurement quantity, reliability of a GNSS positioning location, whether strength of a GNSS signal is greater than a second preset threshold, or a quantity of visible satellites.

Alternatively, the second information includes at least one of the following: information about a type of a cell in which the terminal device is located, quality information of a GNSS measurement quantity, availability of the GNSS measurement quantity, reliability of a GNSS positioning location, whether strength of a GNSS signal is greater than a second preset threshold, or a quantity of visible satellites.

Alternatively, the second information includes at least one of the following: indoor or outdoor information of a cell in which the terminal device is located, quality information of a GNSS measurement quantity, availability of the GNSS measurement quantity, reliability of a GNSS positioning location, whether strength of a GNSS signal is greater than a second preset threshold, or a quantity of visible satellites.

For related descriptions of the indoor or outdoor information of the terminal device, the information about the type of the cell in which the terminal device is located, and the indoor or outdoor information of the cell in which the terminal device is located, refer to the related descriptions in the embodiment shown in FIG. 5.

Optionally, the quality information of the GNSS measurement quantity includes a granularity of the GNSS measurement quantity and/or an uncertainty parameter of a GNSS measurement result. The GNSS measurement quantity is a measurement result obtained by the terminal device by measuring the GNSS signal. The granularity of the GNSS measurement quantity is measurement precision of the GNSS measurement quantity. For example, a smaller granularity of the GNSS measurement quantity indicates lower measurement precision of the GNSS measurement quantity and lower accuracy of the GNSS measurement quantity. A larger granularity of the GNSS measurement quantity indicates higher measurement precision of the GNSS measurement quantity and higher accuracy of the GNSS measurement quantity. The uncertainty parameter of the GNSS measurement result is used to represent accuracy of the GNSS measurement result. For example, a larger value of the uncertainty parameter indicates higher accuracy of the GNSS measurement result. A smaller value of the uncertainty parameter indicates lower accuracy of the GNSS measurement result.

In a possible implementation, the availability of the GNSS measurement quantity indicates availability of a GNSS measurement quantity obtained by the terminal device through measurement. For example, lower availability of the GNSS measurement quantity indicates lower accuracy of the GNSS measurement quantity obtained by the terminal device through measurement. Higher availability of the GNSS measurement quantity indicates higher accuracy of the GNSS measurement quantity.

The availability of the GNSS measurement quantity may be represented in a plurality of implementations. The following describes two possible implementations.

Manner 1: The availability of the GNSS measurement quantity is represented by a value. A larger value indicates higher availability of the GNSS measurement quantity and higher accuracy of the GNSS measurement quantity. A smaller value indicates lower availability of the GNSS measurement quantity and lower accuracy of the GNSS measurement quantity.

Manner 2: The availability of the GNSS measurement quantity is represented by a ratio. A larger ratio indicates higher availability of the GNSS measurement quantity and higher accuracy of the GNSS measurement quantity. A smaller ratio indicates lower availability of the GNSS measurement quantity and lower accuracy of the GNSS measurement quantity.

In another possible implementation, the GNSS measurement quantity indicates whether the GNSS measurement quantity obtained by the terminal device through measurement is available. For example, if the GNSS measurement quantity is unavailable, it indicates that the accuracy of the GNSS measurement quantity is low. If the GNSS measurement quantity is available, it indicates that the accuracy of the GNSS measurement quantity is high. For example, the availability of the GNSS measurement quantity is represented by "1" or "0". When availability of GNSS measurement is represented by "1", it indicates that the GNSS measurement quantity is available, and the accuracy of the GNSS measurement quantity is high. When the availability of the GNSS measurement quantity is represented by "0", it indicates that the GNSS measurement quantity is unavailable, and the accuracy of the GNSS measurement quantity is low.

In a possible implementation, the reliability of the GNSS positioning location indicates reliability of a GNSS positioning location determined by the terminal device. For example, higher reliability of the GNSS positioning location indicates higher accuracy of the GNSS positioning location. Lower reliability of the GNSS positioning location indicates lower accuracy of the GNSS positioning location.

Optionally, the reliability of the GNSS positioning location may be represented by a value, a ratio, or the like. A representation manner of the reliability of the GNSS positioning location is similar to a representation manner of the availability of the GNSS measurement quantity. For details, refer to the foregoing related descriptions.

In another possible implementation, the reliability of the GNSS positioning location indicates whether a GNSS positioning location determined by the terminal device is available. For example, if the GNSS positioning location is unavailable, it indicates that the accuracy of the GNSS positioning location is low. If the GNSS positioning location is available, it indicates that the accuracy of the GNSS positioning location is high.

A representation manner of the reliability of the GNSS positioning location is similar to a representation manner of the reliability of the GNSS positioning location. For details, refer to the foregoing related descriptions.

Whether the strength of the GNSS signal is greater than the second preset threshold is determined. For example, the terminal device can measure GNSS signals of four satellites, and determines whether strength of each GNSS signal is greater than the second preset threshold.

The quantity of visible satellites is a quantity of satellites corresponding to satellite signals that can be received by the terminal device from a perspective of the terminal device.

Usually, there are at least four visible satellites of the terminal device, to implement precise positioning of the terminal device. For example, if the terminal device can receive satellite signals respectively corresponding to four satellites, it can be learned that there are four satellites.

902: The terminal device sends a reply message to the positioning device, and correspondingly, the positioning device receives the reply message from the terminal device.

The reply message includes the GNSS measurement result or location information. The reply message further includes the second information. For content included in the second information, refer to related descriptions in step 901.

The GNSS measurement result may include a measurement result obtained by the terminal device by measuring the GNSS signal. The location information may include a location that is of the terminal device and that is determined by the terminal device through GNSS positioning.

Optionally, the embodiment shown in FIG. 9 further includes step 903 and step 904. Step 903 and step 904 may be performed after step 902.

903: The positioning device determines a positioning method for the terminal device based on the second information.

For example, the second information includes information indicating that the terminal device is located indoors. The positioning device determines that the terminal device is located indoors. Because an indoor GNSS signal is weak, the positioning device may select a positioning method based on a radio access technology for the terminal device.

For example, the second information includes information indicating that the terminal device is located outdoors. The positioning device determines that the terminal device is located outdoors. Quality of the GNSS signal is good. Therefore, the positioning device may keep positioning the terminal device in the GNSS positioning method.

For example, the availability that is of the GNSS measurement quantity and that is included in the second information is high, and the positioning device may keep positioning the terminal device in the GNSS positioning method.

For example, if the quantity of visible satellites included in the second information is greater than 4, the positioning device may keep positioning the terminal device in the GNSS positioning method.

904: The positioning device positions the terminal device in the selected positioning method.

Step 904 is similar to step 204 in the embodiment shown in FIG. 2. For details, refer to the related descriptions of step 204 in the embodiment shown in FIG. 2.

In this embodiment of this application, the positioning device sends the request message to the terminal device. The request message is used to request GNSS positioning. Then, the positioning device receives the reply message from the terminal device. The reply message includes the GNSS measurement result or the location information. The reply message further includes the second information, and the second information indicates that the terminal device is/is not applicable to GNSS measurement. It can be learned that, after the positioning device obtains the second information, the positioning device may select a more applicable positioning method for the terminal device based on the second information, to improve positioning precision, and improve positioning performance.

Step 901 in the embodiment shown in FIG. 9 may be implemented by using a request location information message or another request message. The another request message may alternatively be a newly defined request message or another existing request message. Details may be described with reference to step 1001 in the embodiment shown in FIG. 10.

Step 902 in the embodiment shown in FIG. 9 may be implemented by using a provide location information message or another reply message. The another reply message may alternatively be a newly defined reply message or another existing reply message. Details may be described with reference to step 1002 in the embodiment shown in FIG. 10.

FIG. 10 is a schematic diagram of another embodiment of a communication method according to an embodiment of this application. Refer to FIG. 10. The communication method includes the following steps.

1001: A positioning device sends a request location information message to a terminal device, and correspondingly, the terminal device receives the request location information message from the positioning device.

Optionally, the request location information message includes GNSS request location information. That third information is used to request second information includes: requesting the second information by using the GNSS request location information.

In this implementation, the positioning device requests the second information from the terminal device by using the GNSS request location information in the request location information message. In this way, there is no need to redefine a new information element, so that an information element structure of the request location information message is simple. The GNSS request location information is usually used to list location information requested by the positioning device from the terminal device. Therefore, the positioning device may request the second information by using the GNSS request location information, to help the terminal device understand the request of the positioning device for the second information.

It should be noted that the positioning device may implicitly or explicitly request the second information.

For example, the positioning device explicitly requests the second information by using the GNSS request location information in the request location information message.

For example, the positioning device sends the request location information message to the terminal device. After the terminal device receives the request location information message, the terminal device may feed back the second information to the positioning device. In other words, the request location information message is a specific form in which the positioning device request the second information. The positioning device implicitly requests the second information from the terminal device by using the request location information message.

1002: The terminal device sends a provide location information message to the positioning device, where the provide location information message includes the second information, and correspondingly, the terminal device receives the provide location information message from the positioning device.

Optionally, the provide location information message includes a GNSS provide location information. The second information is carried in the GNSS provide location information.

For example, the second information includes indoor or outdoor information of the terminal device. The indoor or outdoor information of the terminal device is carried in the GNSS provide location information.

For example, the second information includes information about a type of a cell in which the terminal device is located.

The information about the type of the cell in which the terminal device is located is carried in the GNSS provide location information.

For example, the second information includes indoor or outdoor information of the cell in which the terminal device is located. The indoor or outdoor information of the cell in which the terminal device is located is carried in the GNSS provide location information.

For example, the second information includes quality information of a GNSS measurement quantity. The quality information of the GNSS measurement quantity is carried in the GNSS provide location information.

It can be learned that the second information is carried in an information element of the GNSS provide location information. In this way, there is no need to redefine a new information element, so that an information element structure of the provide location information message is simple. In addition, the GNSS provide location information lists location information provided by the terminal device for the positioning device. Therefore, the terminal device may send the second information to the positioning device by using the GNSS provide location information. This helps the positioning device parse the second information.

Figure 11:
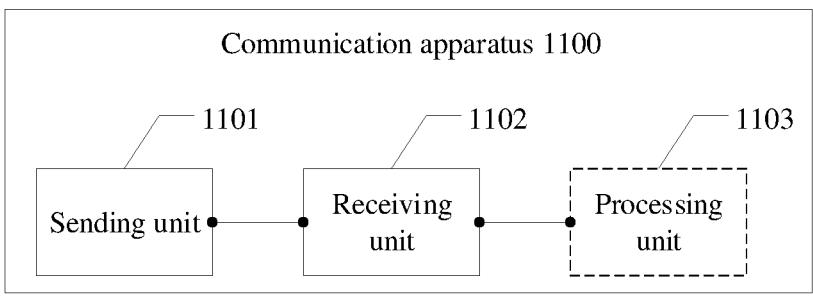
FIG. 11 is an example schematic diagram of a structure of a communication apparatus according to an embodiment of this application.

The following describes a communication apparatus provided in an embodiment of this application. FIG. 11 is a schematic diagram of a structure of a communication apparatus 1100 according to an embodiment of this application. The communication apparatus 1100 includes a sending unit 1101 and a receiving unit 1102. Optionally, the communication apparatus 1100 further includes a processing unit 1103.

When the communication apparatus 1100 is a positioning device or a chip in the positioning device, the communication apparatus 1100 may be configured to perform all or some steps performed by the positioning device in the embodiments shown in FIG. 2 to FIG. 10. For details, refer to the related descriptions in the embodiments shown in FIG. 2 to FIG. 10.

For example, the sending unit 1101 is configured to perform step 201 in the embodiment shown in FIG. 2, and the receiving unit 1102 is configured to perform step 202 in the embodiment shown in FIG. 2.

Optionally, the processing unit 1103 is configured to perform step 203 and step 204 in the embodiment shown in FIG. 2.

For example, the sending unit 1101 is configured to perform step 301 in the embodiment shown in FIG. 3, and the receiving unit 1102 is configured to perform step 302 in the embodiment shown in FIG. 3.

Optionally, the processing unit 1103 is configured to perform step 303 and step 304 in the embodiment shown in FIG. 3.

For example, the sending unit 1101 is configured to perform step 401 in the embodiment shown in FIG. 4, and the receiving unit 1102 is configured to perform step 402 in the embodiment shown in FIG. 4.

For example, the sending unit 1101 is configured to perform step 501 in the embodiment shown in FIG. 5, and the receiving unit 1102 is configured to perform step 502 in the embodiment shown in FIG. 5.

Optionally, the processing unit 1103 is configured to perform step 503 and step 504 in the embodiment shown in FIG. 5.

Optionally, the receiving unit 1102 is further configured to perform step 505 in the embodiment shown in FIG. 5.

For example, the sending unit 1101 is configured to perform step 601 in the embodiment shown in FIG. 6, and the receiving unit 1102 is configured to perform step 602 in the embodiment shown in FIG. 6.

Optionally, the receiving unit 1102 is further configured to perform step 605 in the embodiment shown in FIG. 6.

For example, the sending unit 1101 is configured to perform step 701 in the embodiment shown in FIG. 7, and the receiving unit 1102 is configured to perform step 702 in the embodiment shown in FIG. 7.

Optionally, the processing unit 1103 is configured to perform step 703 and step 704 in the embodiment shown in FIG. 7.

For example, the sending unit 1101 is configured to perform step 801 in the embodiment shown in FIG. 8, and the receiving unit 1102 is configured to perform step 802 in the embodiment shown in FIG. 8.

For example, the sending unit 1101 is configured to perform step 901 in the embodiment shown in FIG. 9, and the receiving unit 1102 is configured to perform step 902 in the embodiment shown in FIG. 9.

Optionally, the processing unit 1103 is configured to perform step 903 and step 904 in the embodiment shown in FIG. 9.

For example, the sending unit 1101 is configured to perform step 1001 in the embodiment shown in FIG. 10, and the receiving unit 1102 is configured to perform step 1002 in the embodiment shown in FIG. 10.

Figure 12:
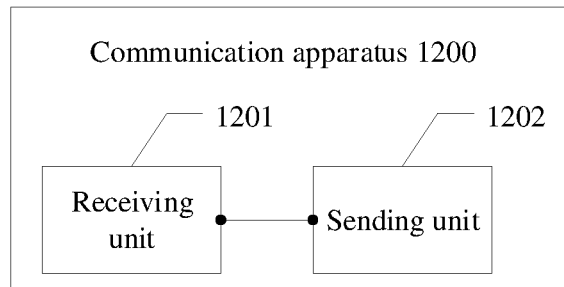
FIG. 12 is an example schematic diagram of another structure of a communication apparatus according to an embodiment of this application.

The following describes a communication apparatus provided in an embodiment of this application. FIG. 12 is a schematic diagram of a structure of a communication apparatus 1200 according to an embodiment of this application. The communication apparatus 1200 includes a receiving unit 1201 and a sending unit 1202.

When the communication apparatus 1200 is an access network device or a chip in the access network device, the communication apparatus 1200 may be configured to perform all or some steps performed by the access network device in the embodiments shown in FIG. 2, FIG. 3, FIG. 4, FIG. 5, and FIG. 6. For details, refer to the related descriptions in the embodiments shown in FIG. 2, FIG. 3, FIG. 4, FIG. 5, and FIG. 6.

For example, the receiving unit 1201 is configured to perform step 201 in the embodiment shown in FIG. 2, and the sending unit 1202 is configured to perform step 202 in the embodiment shown in FIG. 2.

For example, the receiving unit 1201 is configured to perform step 301 in the embodiment shown in FIG. 3, and the sending unit 1202 is configured to perform step 302 in the embodiment shown in FIG. 3.

For example, the receiving unit 1201 is configured to perform step 401 in the embodiment shown in FIG. 4, and the sending unit 1202 is configured to perform step 402 in the embodiment shown in FIG. 4.

For example, the receiving unit 1201 is configured to perform step 501 in the embodiment shown in FIG. 5, and the sending unit 1202 is configured to perform step 502 in the embodiment shown in FIG. 5.

Optionally, the sending unit 1202 is further configured to perform step 505 in the embodiment shown in FIG. 5.

For example, the receiving unit 1201 is configured to perform step 601 in the embodiment shown in FIG. 6, and the sending unit 1202 is configured to perform step 602 in the embodiment shown in FIG. 6.

Optionally, the sending unit 1202 is further configured to perform step 605 in the embodiment shown in FIG. 6.

When the communication apparatus 1200 is a terminal device or a chip in the terminal device, the communication apparatus 1200 may be configured to perform all or some steps performed by the terminal device in the embodiments shown in FIG. 7, FIG. 8, FIG. 9, and FIG. 10. For details, refer to the related descriptions in the embodiments shown in FIG. 7, FIG. 8, FIG. 9, and FIG. 10.

For example, the receiving unit 1201 is configured to perform step 701 in the embodiment shown in FIG. 7, and the sending unit 1202 is configured to perform step 702 in the embodiment shown in FIG. 7.

For example, the receiving unit 1201 is configured to perform step 801 in the embodiment shown in FIG. 8, and the sending unit 1202 is configured to perform step 802 in the embodiment shown in FIG. 8.

For example, the receiving unit 1201 is configured to perform step 901 in the embodiment shown in FIG. 9, and the sending unit 1202 is configured to perform step 902 in the embodiment shown in FIG. 9.

For example, the receiving unit 1201 is configured to perform step 1001 in the embodiment shown in FIG. 10, and the sending unit 1202 is configured to perform step 1002 in the embodiment shown in FIG. 10.

Figure 13:
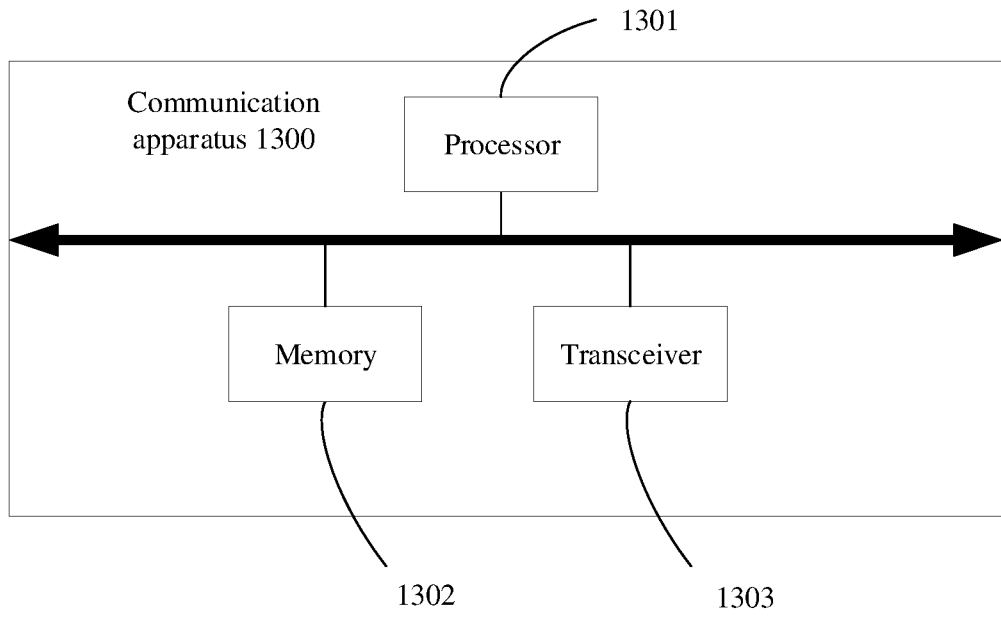
FIG. 13 is an example schematic diagram of another structure of a communication apparatus according to an embodiment of this application.

This application further provides a communication apparatus. FIG. 13 is another schematic diagram of a structure of a communication apparatus 1300 according to an embodiment of this application.

The communication apparatus 1300 includes a processor 1301, a memory 1302, and a transceiver 1303.

The processor 1301, the memory 1302, and the transceiver 1303 are separately connected by using a bus, and the memory stores computer instructions.

When the communication apparatus 1300 is a positioning device or a chip in the positioning device, the communication apparatus 1300 may be configured to perform the steps performed by the positioning device in the embodiments shown in FIG. 2 to FIG. 10. For details, refer to the related descriptions in the method embodiments.

The sending unit 1101 and the receiving unit 1102 shown in FIG. 11 may be specifically the transceiver 1303. The processing unit 1103 shown in FIG. 11 may be specifically the processor 1301.

When the communication apparatus 1300 is an access network device or a chip in the access network device, the communication apparatus 1300 may be configured to perform the steps performed by the access network device in the embodiments shown in FIG. 2 to FIG. 6. For details, refer to the related descriptions in the method embodiments.

The receiving unit 1201 and the sending unit 1202 shown in FIG. 12 may be specifically the transceiver 1303 in this embodiment.

Figure 14:
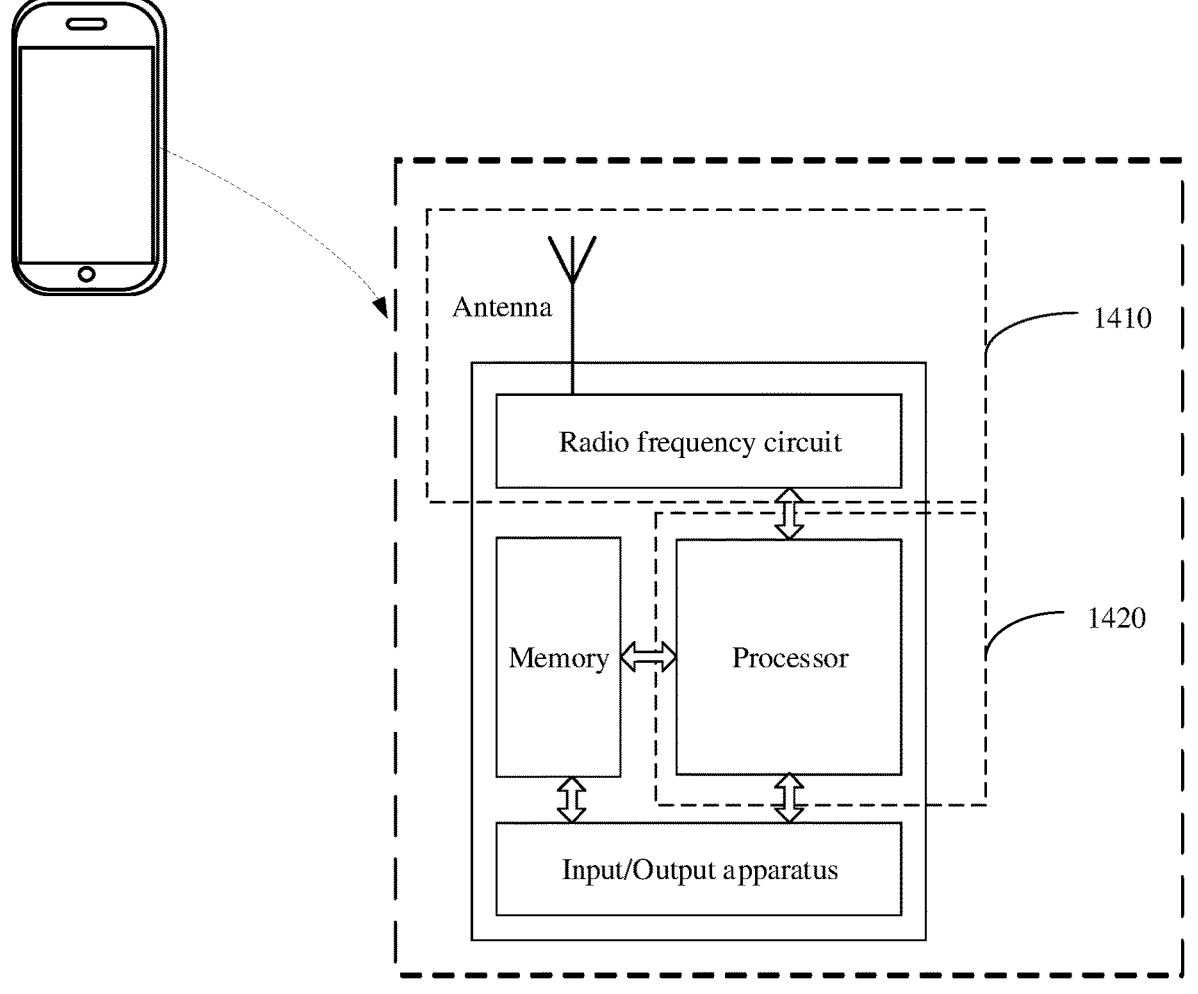
FIG. 14 is an example schematic diagram of a structure of a terminal device according to an embodiment of this application.

The following shows a possible schematic diagram of a structure of a terminal device in FIG. 14.

FIG. 14 is a schematic diagram of simplified a structure of a terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus.

The processor is mainly configured to: process a communication protocol and communication data, control the terminal device, execute a software program, process data of the software program, and the like.

The memory is configured to store the software program and the data.

The radio frequency circuit is mainly configured to: perform conversion between a baseband signal and a radio frequency signal, and process the radio frequency signal.

The antenna is mainly configured to receive and send a radio frequency signal in a form of an electromagnetic wave.

The input/output apparatus, for example, a touchscreen, a display, or a keyboard, is mainly configured to: receive data entered by a user, and output data to the user. It should be noted that some types of terminal devices may not have the input/output apparatus.

When data needs to be transmitted, the processor performs baseband processing on to-be-sent data, and then outputs a baseband signal to the radio frequency circuit, and the radio frequency circuit performs radio frequency processing on the baseband signal, and then sends a radio frequency signal to an outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

For ease of description, FIG. 14 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, an antenna and a radio frequency circuit that have a transceiver function may be considered as a transceiver unit of the terminal device, and a processor that has a processing function may be considered as a processing unit of the terminal device. As shown in FIG. 14, the terminal device includes a transceiver unit 1410 and a processing unit 1420. The transceiver unit may also be referred to as a transceiver, a transceiver machine, a transceiver apparatus, or the like. The processing unit may also be referred to as a processor, a processing board, a processing module, a processing apparatus, or the like.

Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit may sometimes be referred to as a transceiver, a transceiver machine, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

It should be understood that the transceiver unit 1410 is configured to perform a sending operation and a receiving operation of the terminal device in the method embodiments, and the processing unit 1420 is configured to perform an operation other than the sending operation and the receiving operation of the terminal device in the method embodiments.

In a possible implementation, the transceiver unit 1410 is configured to perform step 701 and step 702 in the embodiment shown in FIG. 7.

In another possible implementation, the transceiver unit 1410 is configured to perform step 801 and step 802 in the embodiment shown in FIG. 8.

In another possible implementation, the transceiver unit 1410 is configured to perform step 901 and step 902 in the embodiment shown in FIG. 9.

In another possible implementation, the transceiver unit 1410 is configured to perform step 1001 and step 1002 in the embodiment shown in FIG. 10.

When the terminal device is a chip, the chip includes a transceiver unit and a processing unit. The transceiver unit may be an input/output circuit or a communication interface. The processing unit is a processor, a microprocessor, an integrated circuit, or a logic circuit integrated on the chip. In the method embodiments, the sending operation corresponds to an output of the input/output circuit, and the receiving operation corresponds to an input of the input/output circuit.

Figure 15:
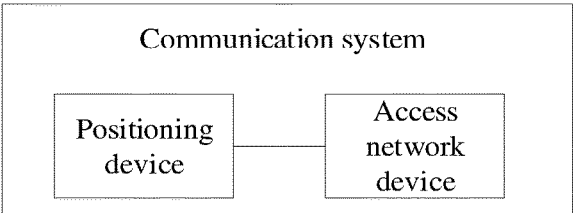
FIG. 15 is an example schematic diagram of a structure of a communication system according to an embodiment of this application.

An embodiment of this application further provides a communication system. FIG. 15 is a schematic diagram of a communication system according to an embodiment of this application. The communication system includes a positioning device and an access network device. The positioning device is configured to perform all or some steps performed by the positioning device in the embodiments shown in FIG. 2 to FIG. 6. The access network device is configured to perform all or some steps performed by the access network device in the embodiments shown in FIG. 2 to FIG. 6.

An embodiment of this application further provides a computer program product including computer instructions. When the computer program product runs on a computer, the computer is enabled to perform the communication method in the embodiments shown in FIG. 2 to FIG. 10.

An embodiment of this application further provides a computer-readable storage medium, including computer instructions. When the computer instructions run on a computer, the computer is enabled to perform the communication method in the embodiments shown in FIG. 2 to FIG. 10.

An embodiment of this application further provides a chip apparatus, including a processor, configured to invoke a computer program stored in a memory, so that the processor performs the communication method in the embodiments shown in FIG. 2 to FIG. 10.

Optionally, the processor is coupled to the memory through an interface.

Optionally, the chip apparatus further includes a memory, and the memory stores a computer program.

The processor mentioned above may be a general-purpose central processing unit, a microprocessor, an application-specific integrated circuit (application-specific integrated circuit, ASIC), or one or more integrated circuits for controlling program execution of the communication method in the embodiments shown in FIG. 2 to FIG. 10.

The memory mentioned above may be a read-only memory (ROM), another type of static storage device that can store static information and instructions, a random access memory (RAM), or the like.

In addition, it should be noted that the described apparatus embodiments are merely examples. The units described as separate parts may or may not be physically separate, and parts displayed as units may or may not be physical units, in other words, may be located in one place, or may be distributed on a plurality of network units. Some or all modules may be selected based on an actual requirement, to achieve objectives of the solutions in embodiments. In addition, in the accompanying drawings of the apparatus embodiments provided in this application, connection relationships between modules indicate that the modules have communication connections with each other, and may be specifically implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function completed by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, network device, local computing device, computing device, or data center to another website, computer, local computing device, computing device, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, for example, a network device, a local computing device, or a data center in which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily mean a same embodiment. In addition, these particular features, structures, or characteristics may be combined in one or more embodiments by using any proper manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the method embodiment.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, in other words, may be located in one place, or may be distributed on a plurality of network units. Some or all of the units may be selected based on an actual requirement, to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application.

In conclusion, the foregoing descriptions are merely example embodiments of the technical solutions of this application, and are not intended to limit the protection scope of this application. Any modification, equivalent replacement, or improvement made without departing from the spirit and principle of this application shall fall within the protection scope of this application.

What is claimed is:

1. A communication method, comprising:

sending, by a positioning device, a request to an access network device by using a transmission reception point (TRP) information request message, wherein the request is used to request information about a cell type of the access network device, and the cell type includes an indoor cell or an outdoor cell, or the cell type includes any one of: a macro cell, a micro cell, or a lampsite cell; and receiving, by the positioning device, the information about the cell type from the access network device by using a TRP information response message.

2. The method according to claim 1, wherein the TRP information request message includes a TRP information type item, and the request being used to request the information about the cell type of the access network device includes:

requesting the information about the cell type of the access network device by using the TRP information type item.

3. The method according to claim 2, wherein the TRP information response message includes TRP information carrying the information about the cell type.

4. The method according to claim 1, wherein the positioning device is a location management function (LMF) device.

5. The method according to claim 1, wherein the positioning device selects a positioning method that includes any of a radio access technology and a global navigation satellite system (GNSS).

6. The method according to claim 5, wherein the radio access technology positioning method includes any of: an uplink positioning method, a downlink positioning method, or a single-site positioning method.

7. A communication method, comprising:

receiving, by an access network device, a request from a positioning device by using a transmission reception point (TRP) information request message, wherein the request is used to request information about a cell type of the access network device, and the cell type includes an indoor cell or an outdoor cell, or the cell type includes any one of: a macro cell, a micro cell, or a lampsite cell; and sending, by the access network device, the information about the cell type to the positioning device by using a TRP information response message.

8. The method according to claim 7, wherein the TRP information request message includes a TRP information type item, and the information about the cell type of the access network device is requested by using the TRP information type item.

9. The method according to claim 7, wherein the TRP information response message includes TRP information carrying the information about the cell type.

10. The method according to claim 7, wherein the positioning device is a location management function (LMF) device.

11. The method according to claim 7, wherein the positioning device selects a positioning method that includes any of a radio access technology and a global navigation satellite system (GNSS).

12. The method according to claim 11, wherein the radio access technology positioning method includes any of: an uplink positioning method, a downlink positioning method, or a single-site positioning method.

13. A communication apparatus, comprising:

processing circuitry including at least one processor and at least one transceiver, wherein the processing circuitry is configured to:

send a request to an access network device by using a transmission reception point (TRP) information request message, wherein the request is used to request information about a cell type of the access network device, and the cell type includes an indoor cell or an outdoor cell, or the cell type includes any one of: a macro cell, a micro cell, or a lampsite cell; and receive the information about the cell type from the access network device by using a TRP information response message.

14. The communication apparatus according to claim 13, wherein the TRP information request message includes a TRP information type item, and the information about the cell type of the access network device is requested by using the TRP information type item.

15. The communication apparatus according to claim 13, wherein the TRP information response message includes TRP information carrying the information about the cell type.

16. The communication apparatus according to claim 13, wherein the communication apparatus is a location management function (LMF) device.

17. The communication apparatus according to claim 13, wherein the communication apparatus selects a positioning method that includes any of a radio access technology and a global navigation satellite system (GNSS).

18. The communication apparatus according to claim 17, wherein the radio access technology positioning method includes any of: an uplink positioning method, a downlink positioning method, or a single-site positioning method.

* * * * *